United States Patent
Kismarton

(10) Patent No.: US 9,193,483 B2
(45) Date of Patent: Nov. 24, 2015

(54) METHOD OF FORMING A WINDOW CUTOUT IN AN AIRFRAME

(71) Applicant: The Boeing Company, Chicago, IL (US)

(72) Inventor: Max U. Kismarton, Renton, WA (US)

(73) Assignee: The Boeing Company, Chicago, IL (US)

( * ) Notice: Subject to any disclaimer, the term of this patent is extended or adjusted under 35 U.S.C. 154(b) by 175 days.

(21) Appl. No.: 14/086,288

(22) Filed: Nov. 21, 2013

(65) Prior Publication Data

US 2014/0076477 A1  Mar. 20, 2014

Related U.S. Application Data

(62) Division of application No. 13/041,299, filed on Mar. 4, 2011, now Pat. No. 8,616,500.

(51) Int. Cl.
| | |
|---|---|
| *B64C 1/14* | (2006.01) |
| *B64F 5/00* | (2006.01) |
| *B64C 1/06* | (2006.01) |
| *B64C 1/00* | (2006.01) |

(52) U.S. Cl.
CPC .............. *B64F 5/0009* (2013.01); *B64C 1/068* (2013.01); *B64C 1/1484* (2013.01); *B64C 1/1492* (2013.01); *B64C 2001/0072* (2013.01); *Y02T 50/433* (2013.01); *Y10T 83/04* (2015.04); *Y10T 156/1064* (2015.01)

(58) Field of Classification Search
CPC .............................. B64C 1/1492; B64C 1/1484
See application file for complete search history.

(56) References Cited

U.S. PATENT DOCUMENTS

| | | | | |
|---|---|---|---|---|
| 2,473,616 | A * | 6/1949 | Stephenson ................ | 244/129.3 |
| 3,429,530 | A * | 2/1969 | Hertel ......................... | 244/129.3 |
| 4,278,485 | A * | 7/1981 | Hamm et al. ............... | 156/173 |
| 4,450,661 | A * | 5/1984 | Whitener .................... | 52/206 |
| 6,068,902 | A * | 5/2000 | Vasiliev et al. ............. | 428/36.3 |
| 6,155,450 | A * | 12/2000 | Vasiliev et al. ............. | 220/589 |
| 6,318,035 | B1 | 11/2001 | Jesse | |
| 6,736,352 | B2 * | 5/2004 | Bladt et al. ................. | 244/129.3 |
| D512,365 | S | 12/2005 | Bladt et al. | |
| 7,014,806 | B2 * | 3/2006 | Edelmann et al. .......... | 264/152 |
| 7,166,251 | B2 * | 1/2007 | Blankinship ................ | 264/258 |
| 8,245,975 | B2 * | 8/2012 | Abel et al. ................... | 244/129.3 |

(Continued)

FOREIGN PATENT DOCUMENTS

| | | |
|---|---|---|
| DE | 4408476 | 9/1995 |
| DE | 4408476 A1 * | 9/1995 |

(Continued)

OTHER PUBLICATIONS

Rouse, Marshall, et al. "Response of Composite Fuselage Sandwich Side Panels Subjected to Internal Pressure and Axial Tension." Journal of Aircraft vol. 43, No. 5, Sep.-Oct. 2006.*

(Continued)

*Primary Examiner* — Philip J Bonzell
*Assistant Examiner* — Michael Kreiner

(57) ABSTRACT

A method of forming cutouts in an aircraft fuselage may include forming a first cutout and a second cutout in side-by-side relation to one another in a side region of the fuselage. The method may further include configuring the first cutout and the second cutout such that a direct load path extends along the side region substantially continuously from a lower portion of the side region generally under the first cutout to an upper portion of the side region generally over the second cutout.

20 Claims, 17 Drawing Sheets

(56) References Cited

U.S. PATENT DOCUMENTS

| | | | |
|---|---|---|---|
| 8,398,910 B2 | 3/2013 | Kastner et al. | |
| 2003/0234322 A1 | 12/2003 | Bladt et al. | |
| 2010/0308168 A1* | 12/2010 | Joern | 244/129.3 |
| 2010/0320324 A1* | 12/2010 | Dittmar et al. | 244/129.3 |
| 2012/0141703 A1* | 6/2012 | Goetze | 428/34.1 |

FOREIGN PATENT DOCUMENTS

| | | |
|---|---|---|
| DE | 102009057018 A1 * | 6/2011 |
| EP | 1375339 | 1/2004 |
| WO | WO8301237 | 4/1983 |
| WO | WO2007141176 | 12/2007 |

OTHER PUBLICATIONS

Alhajahmad, Ahmad, et al. "Optimal Design of a Pressurized Fuselage Panel with a Cutout Using Tow-Placed Steered Fibers." EngOpt 2008—International Conference on Engineering Optimization. Rio de Janeiro, Brazil, Jun. 5, 2008.*

Oterkus, E., et al. "Stress Analysis of Composite Cylindrical Shells With an Elliptical Cutout." American Institute of Aeronautics and Astronautics, 2005.*

International Search Report, PCT/US2012/023819, dated Feb. 3, 2012.

Chinese Office Action dated Aug. 19, 2015, Chinese Patent Application No. 2012800115165.

* cited by examiner

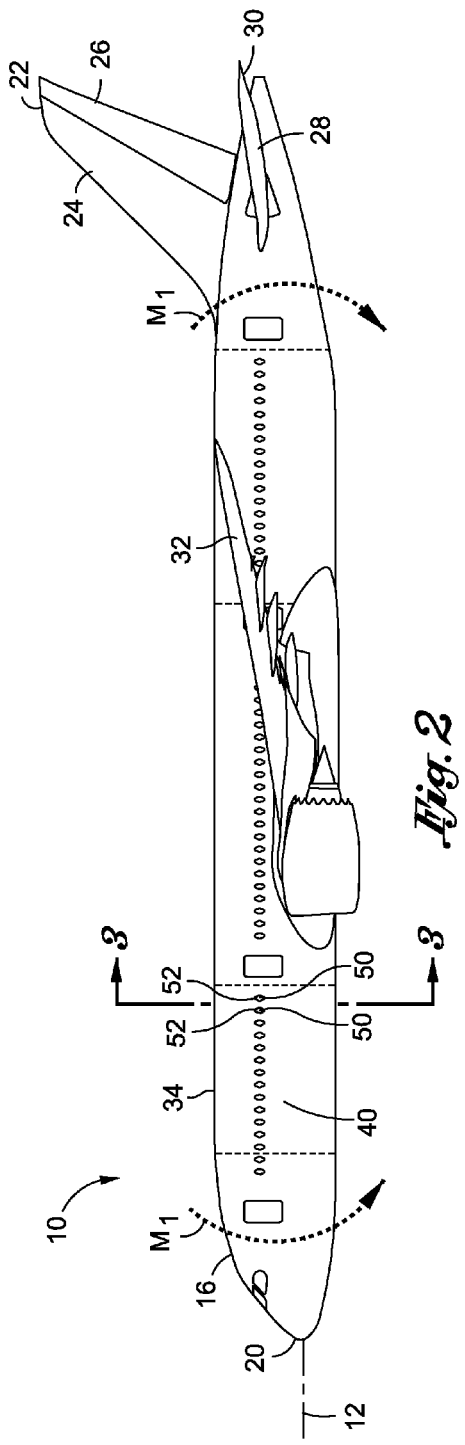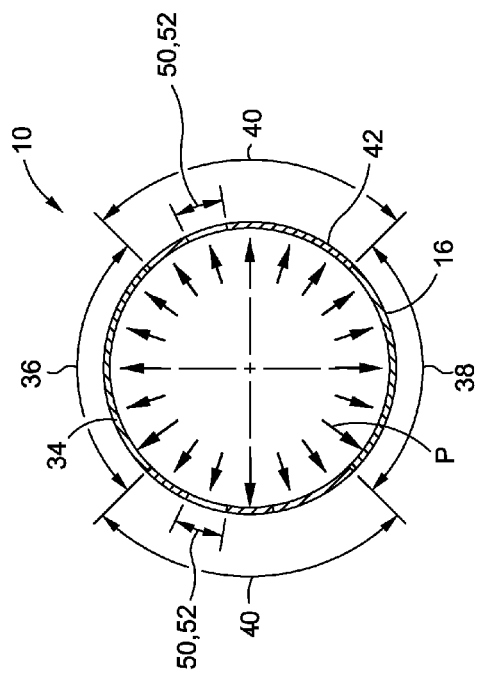

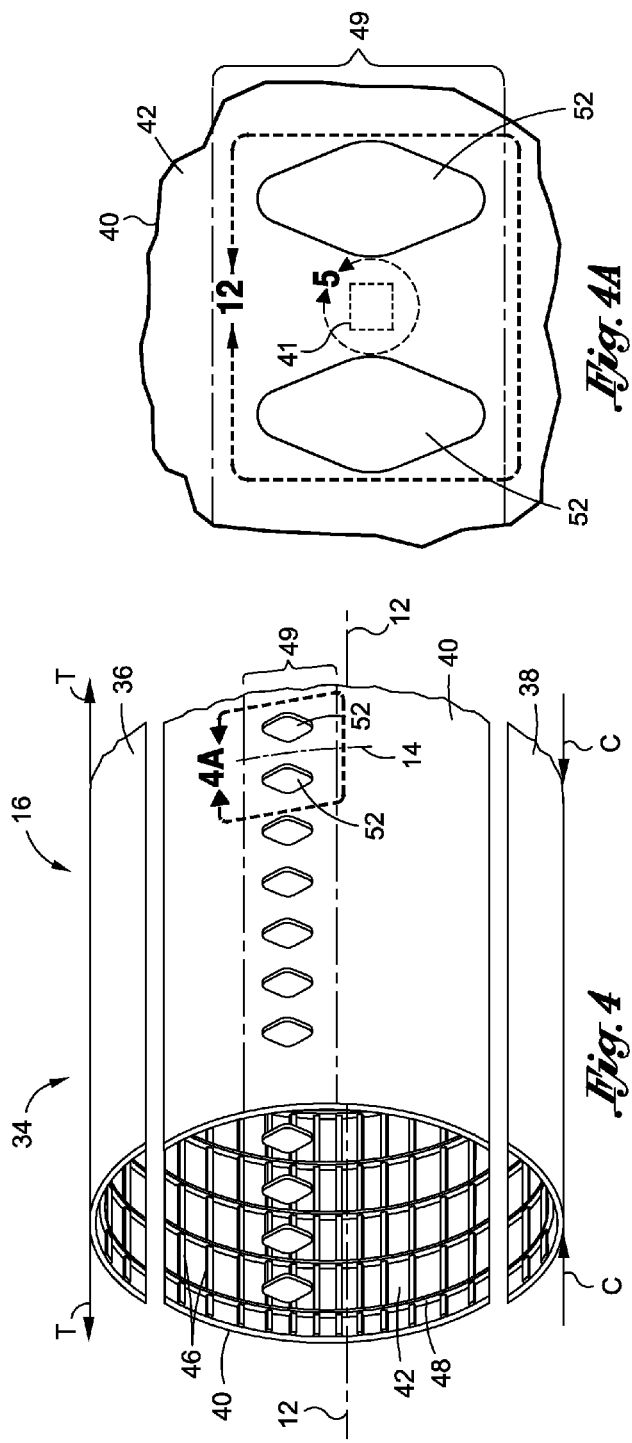
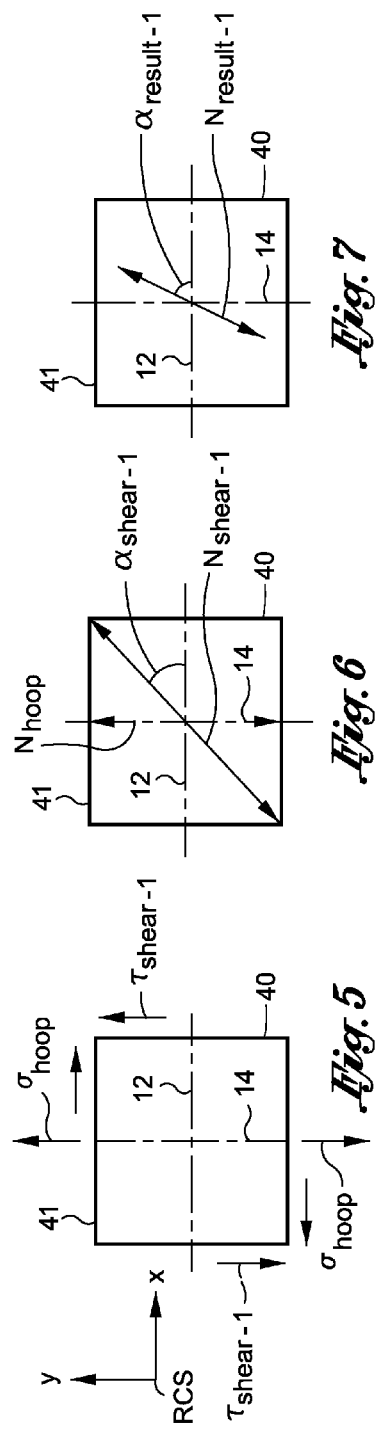

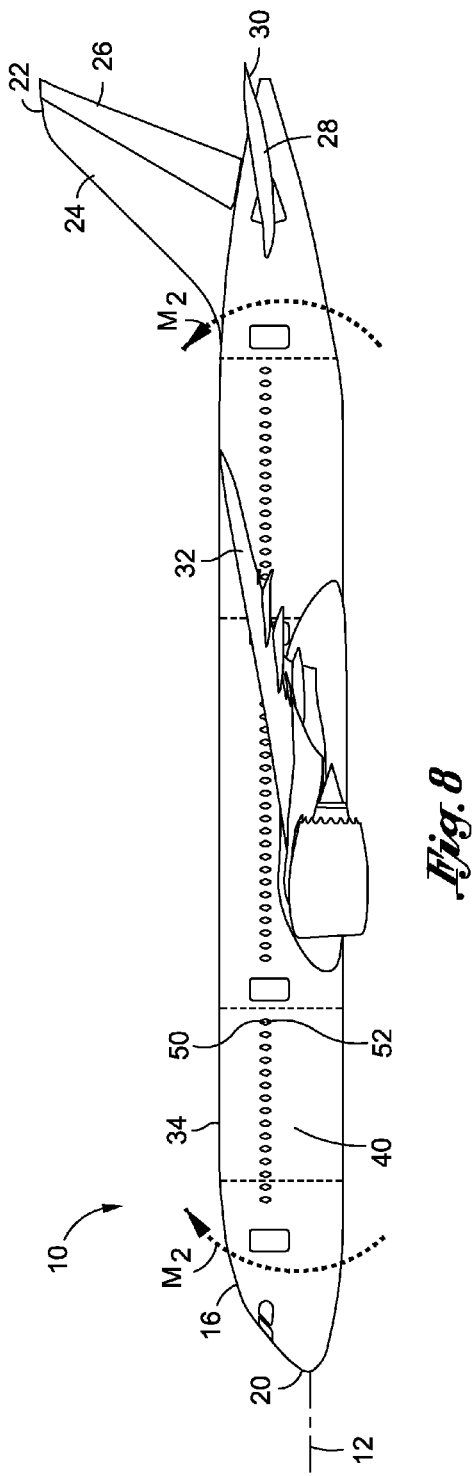
*Fig. 8*
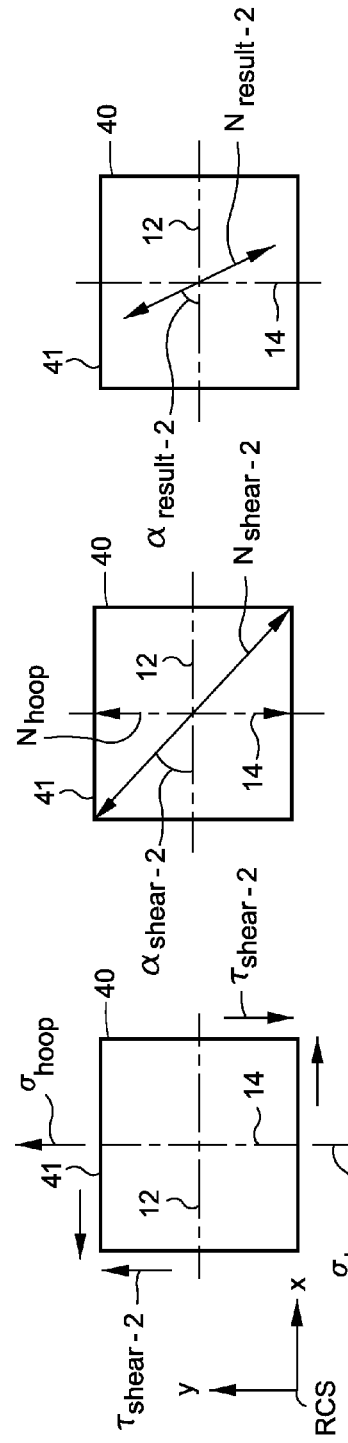
*Fig. 11*
*Fig. 10*
*Fig. 9*

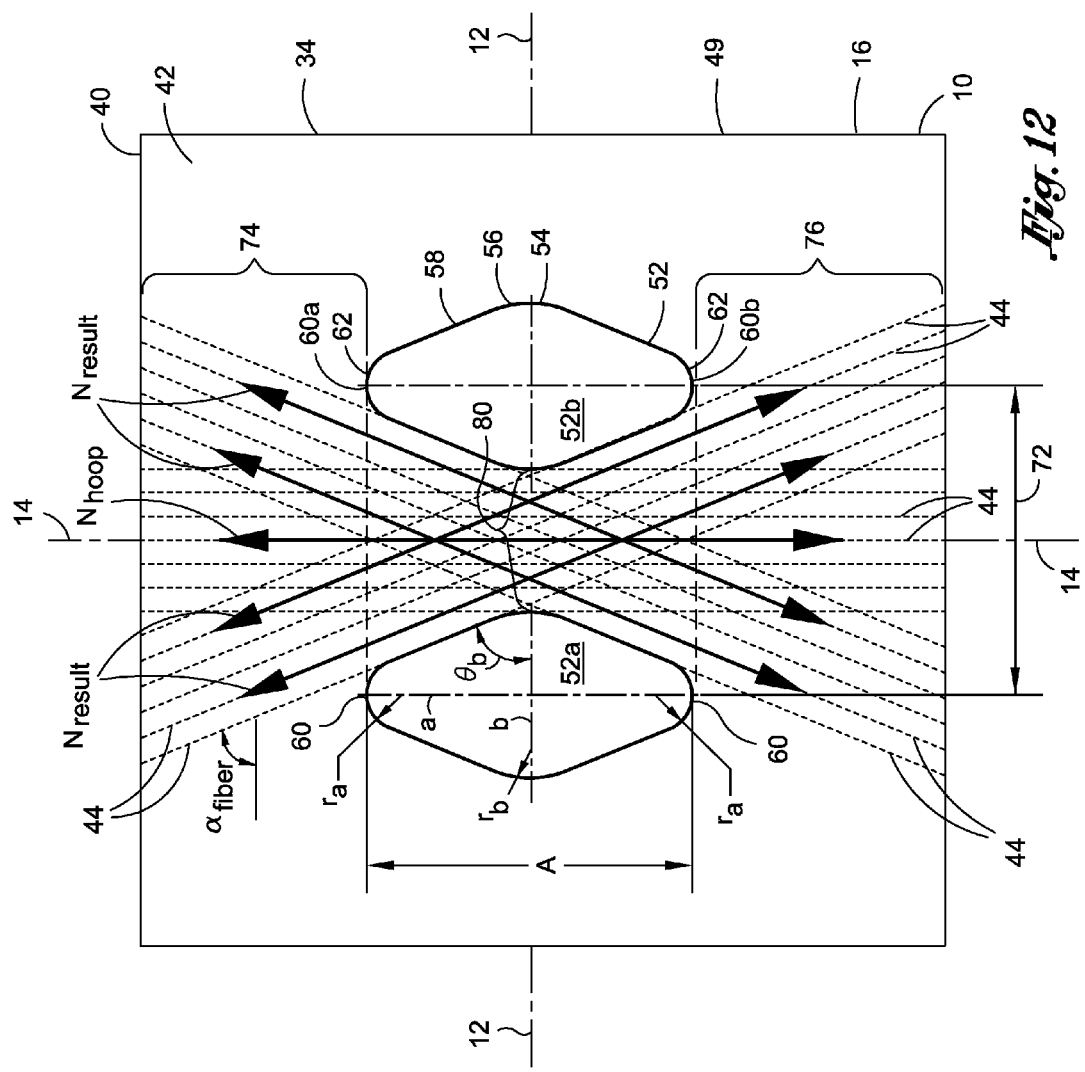

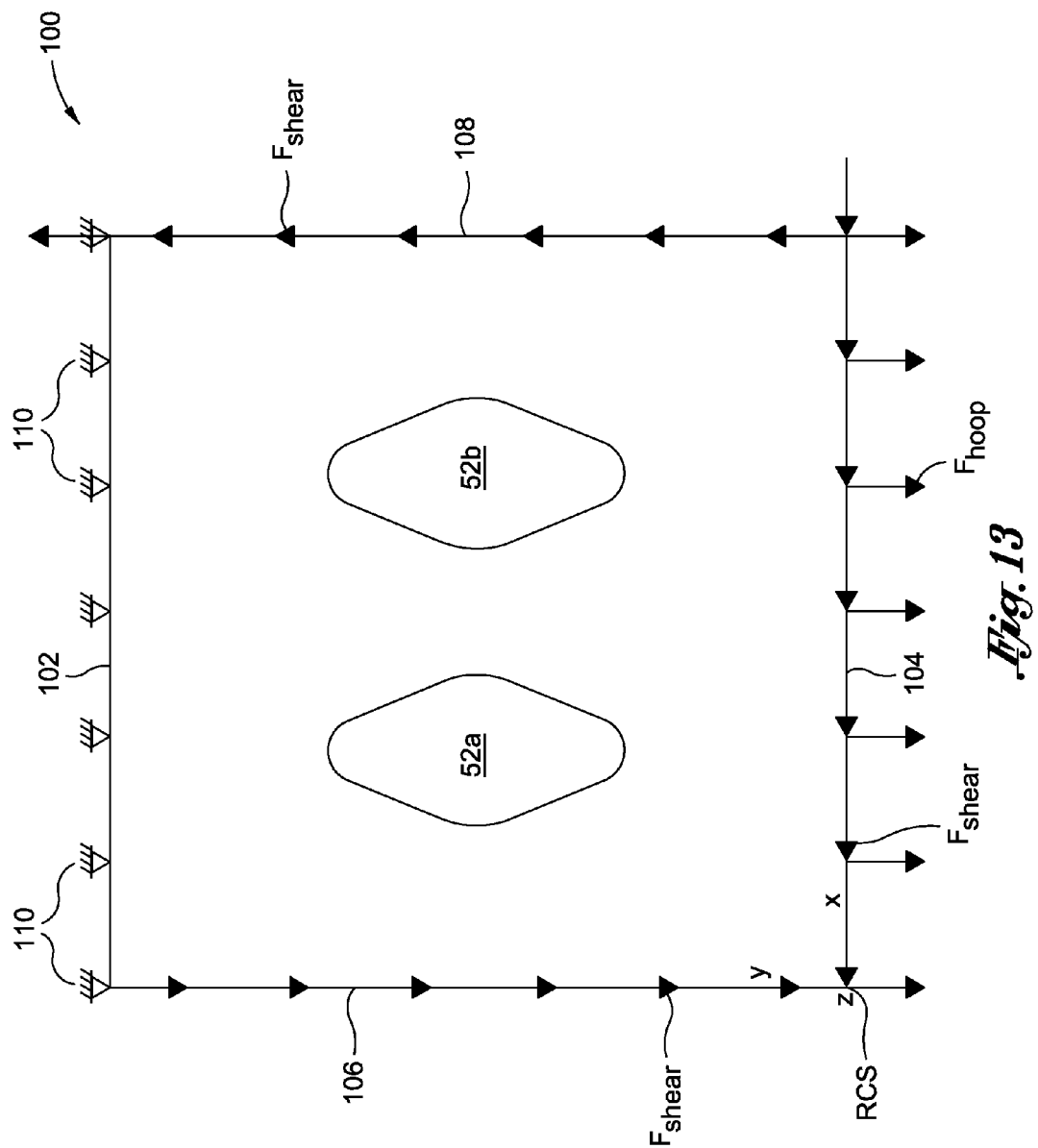

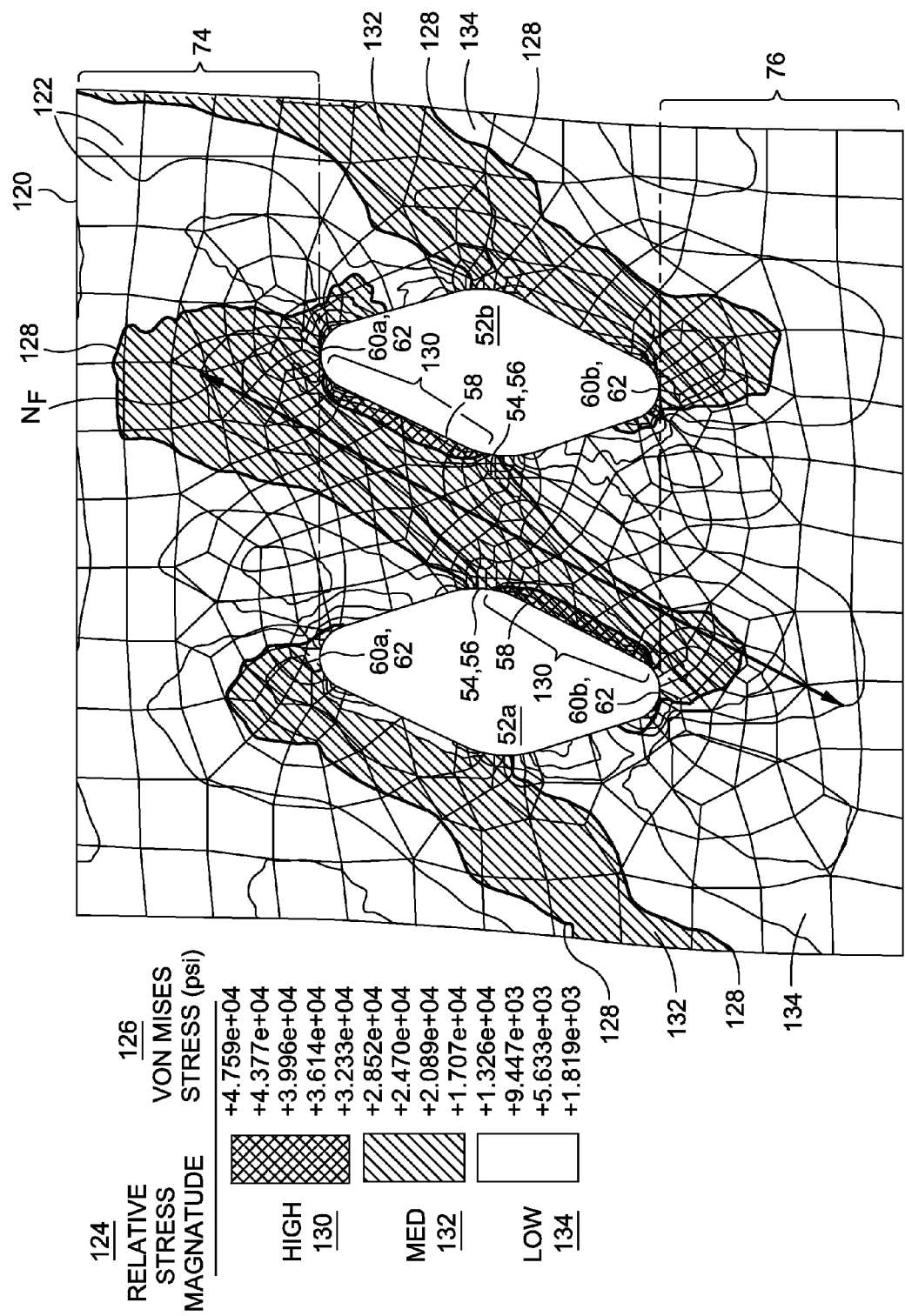

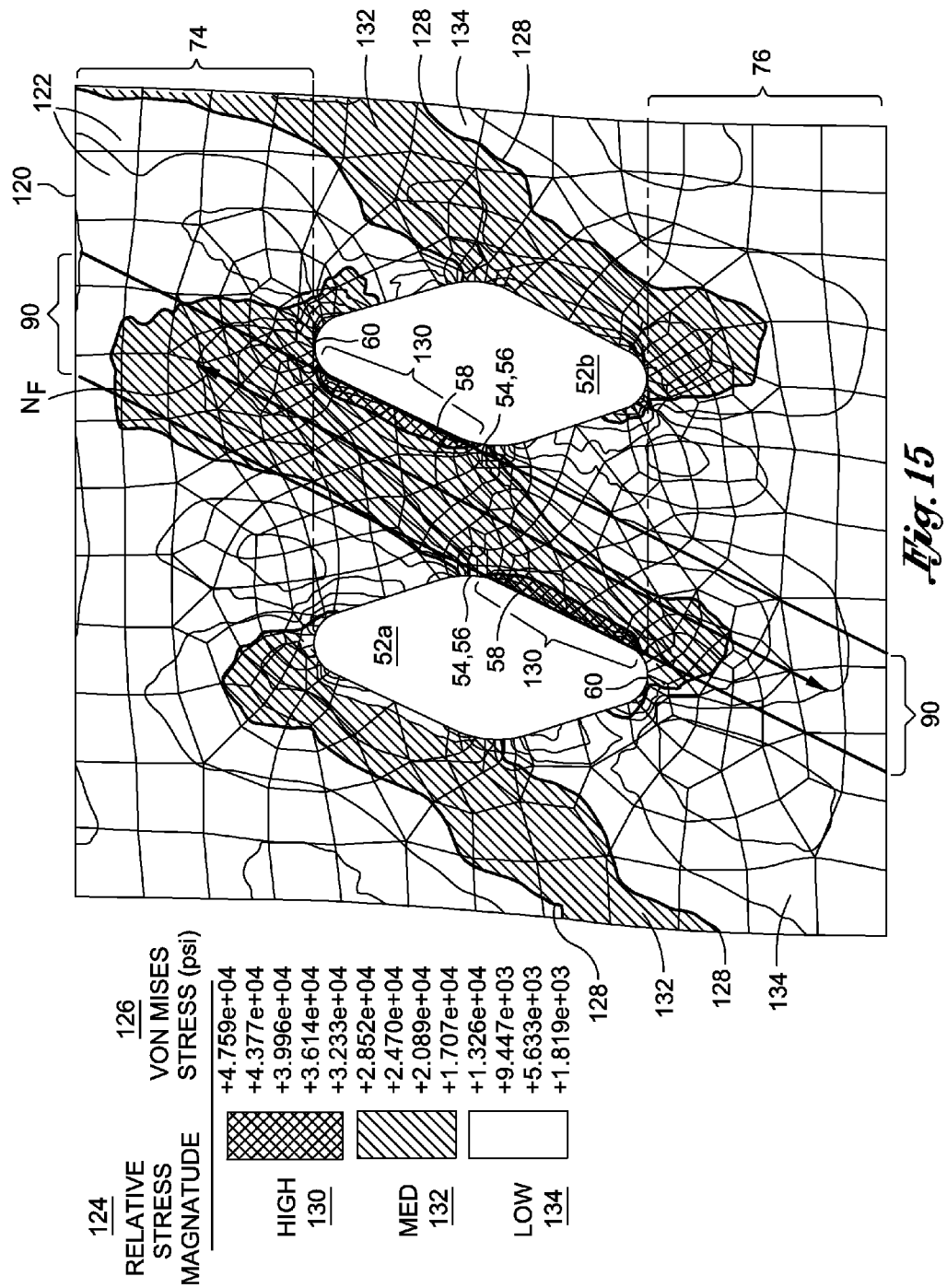

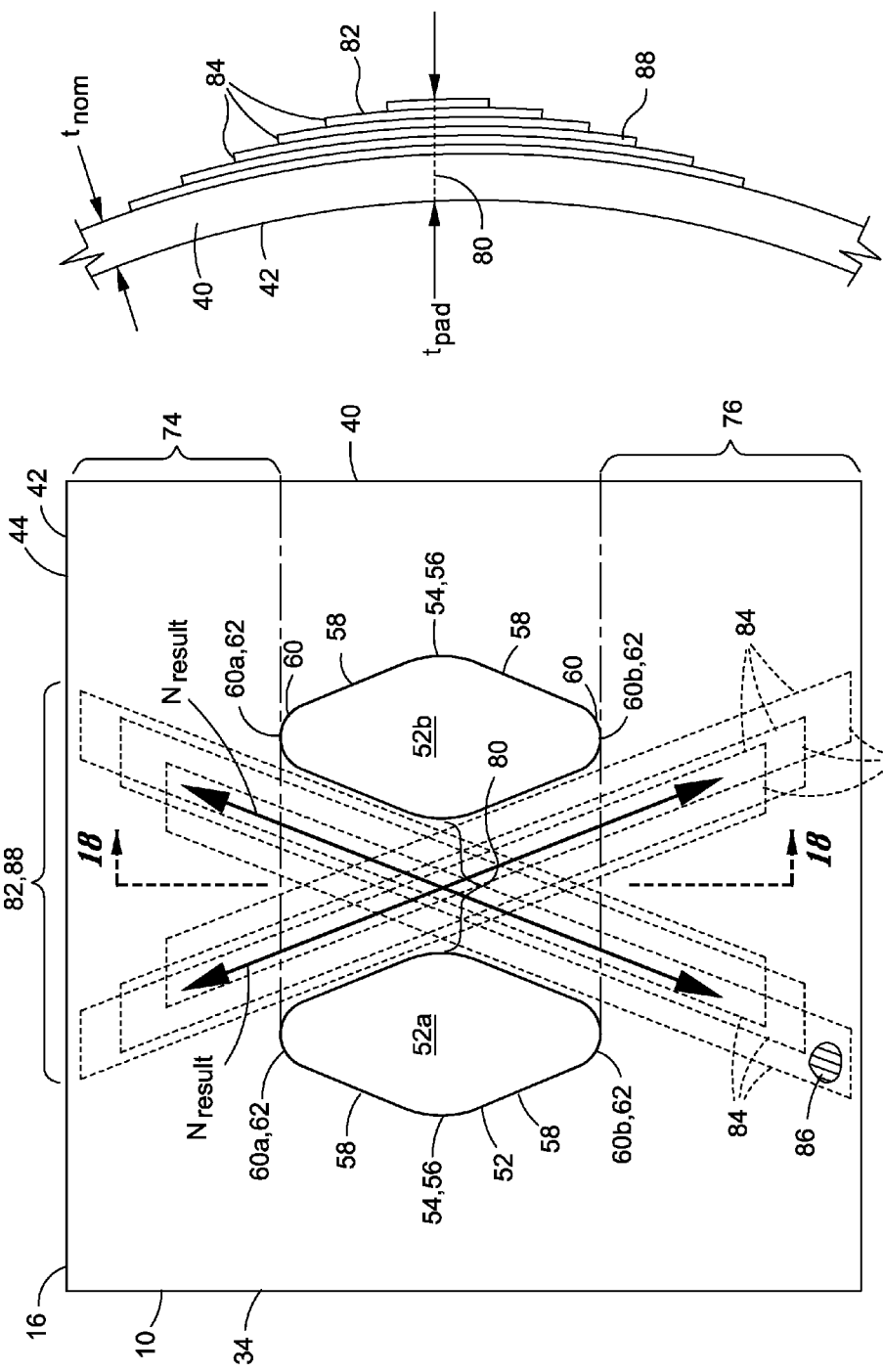

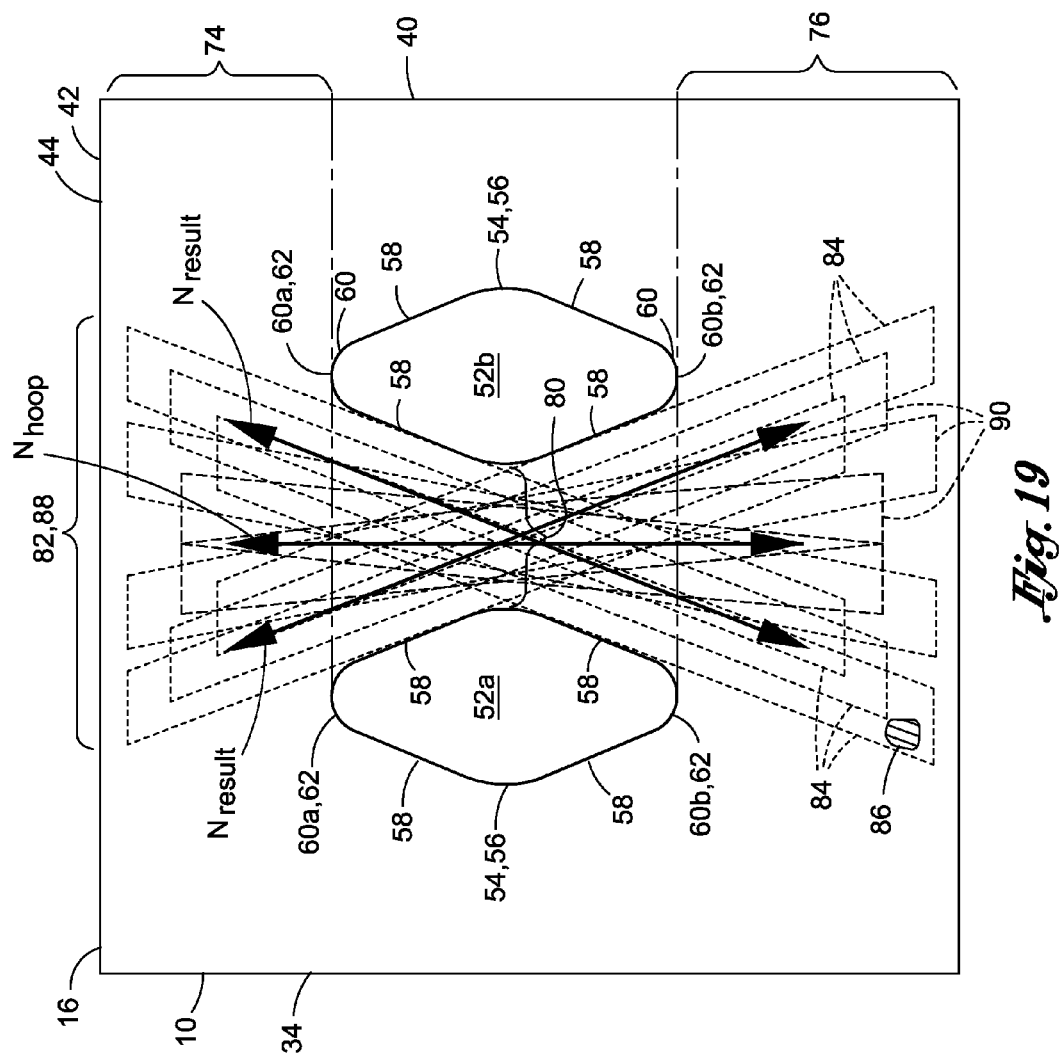

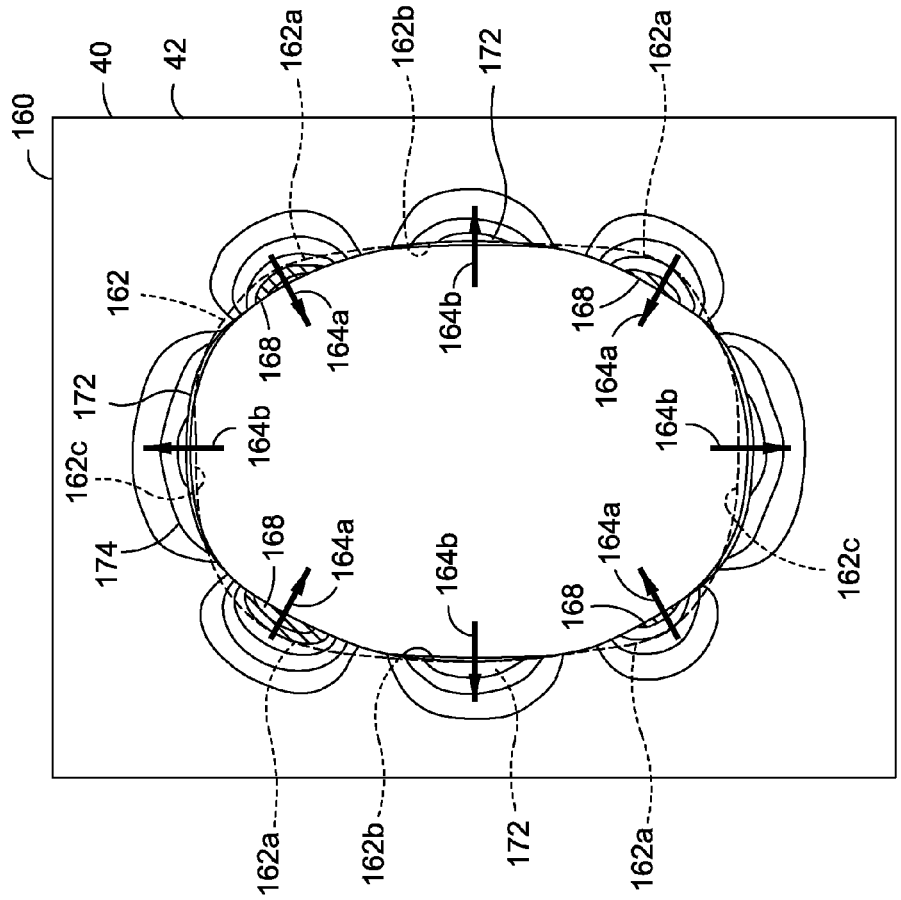
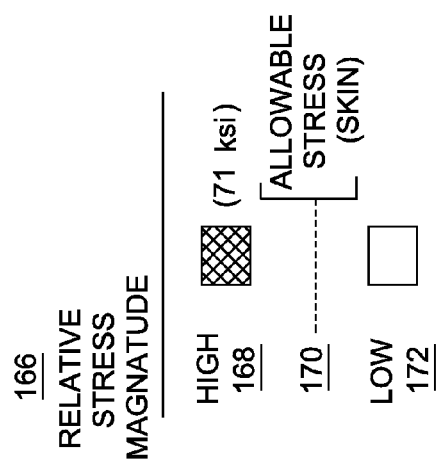
Fig. 20

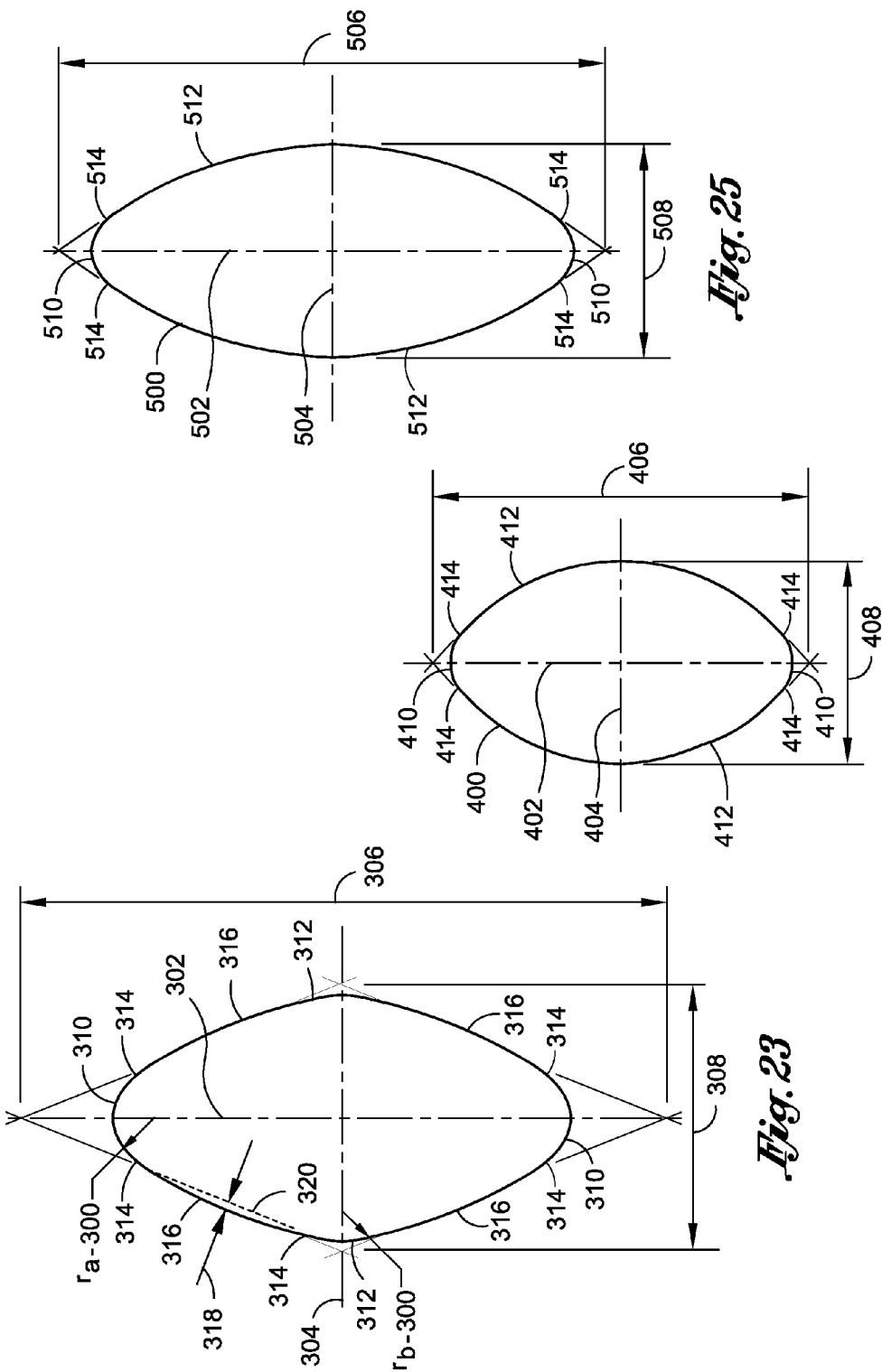

METHOD OF FORMING A WINDOW CUTOUT IN AN AIRFRAME

CROSS-REFERENCE TO RELATED APPLICATIONS

The present application is a divisional application of and claims priority to pending U.S. application Ser. No. 13/041,299 filed on Mar. 4, 2011 and entitled DIAMOND SHAPED WINDOW FOR COMPOSITE AND/OR METALLIC AIRFRAME, the entire contents of which is expressly incorporated by reference herein.

FIELD

The present disclosure relates generally to aircraft windows and, more particularly, to an optimized cutout shape for an aircraft fuselage.

BACKGROUND

Conventional passenger aircraft used in commercial aviation typically include passenger windows mounted along the sides of the aircraft fuselage. The laterally-facing windows are typically arranged in a single row in a window belt that extends between the forward and aft ends on each side of the fuselage. Each window is typically mounted in a window cutout formed in the sides.

During service, the aircraft is subjected to a variety of different loads of different magnitude and orientation. For example, during flight, the weight of the aircraft and the aircraft payload (e.g., passengers, baggage, cargo) are supported by the aircraft wings. During normal cruise flight, the weight of the aircraft and payload cause a bending moment on the fuselage. The bending moment generates an in-plane shear load on each side of the fuselage. The shear load results in tension and compression components of the shear load in the side region and which are oriented at approximately 45 degrees relative to the aircraft longitudinal axis. The shear load passes through the window belt connecting the crown region of the fuselage to the keel region of the fuselage.

Conventional aircraft windows typically have an oval shape and are spaced along the aircraft fuselage at a relatively short pitch distance. The pitch distance between the windows typically corresponds to the distance between the circumferential frames which are typically spaced at approximately 22-24 inches along the interior side of the fuselage skin. The combination of the relatively short pitch distance and the oval shape of conventional aircraft windows results in a discontinuous or contorted load path for the shear loads. In this regard, the oval-shaped windows and the pitch distance prevent the shear load from passing in a straight line between the windows and instead create a discontinuity in the shear load path forcing the shear load to go around each oval-shaped window.

The discontinuous load path results in stress concentrations along the edges of the window cutouts requiring an increase in skin thickness around the cutouts to maintain the stress below the allowable limits of the skin material. The increased skin thickness increases the cost, complexity and production time of the aircraft. In addition, the increase in weight due to the increased skin thickness reduces the payload capacity of the aircraft and increases fuel consumption.

As can be seen, there exists a need in the art for a window cutout having an optimized shape that improves the load path between the window cutouts in the side regions of the fuselage. In addition, there exists a need in the art for an arrangement that optimizes the skin thickness in areas adjacent to the window cutouts.

SUMMARY

The above-noted needs associated with cutouts are specifically addressed by the present disclosure which, in an embodiment, provides an aircraft fuselage having a barrel section with at least one side region. The barrel section may include a first cutout and a second cutout formed in the side region in side-by-side relation to one another. The barrel section may provide a direct load path extending along the barrel section. The load path may extend substantially continuously from a lower portion of the barrel section generally under the first cutout to an upper portion of the barrel section generally over the second cutout.

Also disclosed is an aircraft fuselage having a side region including a first cutout and a second cutout formed in side-by-side relation to one another. At least one of the first and second cutouts may have a side segment. The fuselage may be subject to a bending moment generating a shear load in the side region and a cabin pressurization load generating a hoop tension load in the side region. The side segment may be oriented substantially parallel to a path of a resultant of the shear load and the hoop tension load.

In a further embodiment, disclosed is an aircraft fuselage having a barrel section. The barrel section may include at least one side panel. The barrel section may include a first cutout and a second cutout formed in the side region in side-by-side relation to one another. The barrel section may provide a direct load path extending along the barrel section. The load path may extend substantially continuously from a lower portion of the side panel generally under the first cutout to an upper portion of the side panel generally over the second cutout.

The present disclosure further includes a method of forming cutouts in a side of an aircraft fuselage such as in side region of a barrel section. The method may include the steps of forming a first cutout and a second cutout in side-by-side relation to one another in the barrel section and spacing the first cutout at a pitch distance from the second cutout. The method may additionally include configuring the first cutout and the second cutout such that a direct load path extends along the barrel section substantially continuously from a lower portion of the barrel section generally under the first cutout to an upper portion of the barrel section generally over the second cutout.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein:

FIG. 2 is a side view of the aircraft illustrating a bending moment applied to the fuselage;

FIG. 3 is a cross-sectional view taken along line 3 of FIG. 2 and illustrating a cabin pressurization load applied to a barrel section of the fuselage;

FIG. 4 is a perspective view of the barrel section having four circumferential quadrants including a crown region, a keel region, and a pair of side regions and illustrating a tension load in the crown region and a compression load in the keel region as a result of the bending moment shown in FIG. 2;

FIG. 4A is a side view of a portion of the side region taken along line 4A of FIG. 4 and illustrating a pair of diamond shaped window cutouts formed in the side region;

FIG. 5 is an illustration of a representative element of the side region taken along line 5 of FIG. 4A and illustrating the tension component of the shear stress occurring in the side region as a result of the bending moment applied to the fuselage in FIG. 2 and further illustrating a hoop tension stress occurring in the side region as a result of the cabin pressurization load shown in FIG. 3;

FIG. 6 is an illustration of a shear load path and a hoop tension load path corresponding to the shear stress and hoop tension stress of FIG. 5;

FIG. 7 is an illustration of a load path of a resultant of the shear load and the hoop tension load of FIG. 6;

FIG. 8 is a side view of the aircraft illustrating a bending moment applied to the fuselage in a direction opposite to the bending moment shown in FIG. 2;

FIG. 9 is an illustration of the representative element of the side region showing the orientation of the shear stress in the side region as a result of the bending moment of FIG. 8 and illustrating the hoop tension stress in the side region as a result of the cabin pressurization load of FIG. 3;

FIG. 10 is an illustration of a shear load path and a hoop tension load path corresponding to the shear stress and hoop tension stress of FIG. 9;

FIG. 11 is an illustration of a load path of a resultant of the shear load and the hoop tension load of FIG. 10;

FIG. 12 is a side view of a portion of the side region taken along line 12 of FIG. 4A and illustrating the pair of diamond shaped window cutouts formed in a skin of the side region and further illustrating reinforcing fibers oriented substantially parallel to one or more load paths;

FIG. 13 is a diagram of loads and boundary conditions applied to a finite element mode (FEM) (FIG. 14) of the side region for simulating and predicting the structural response of the side region to a shear load and a hoop tension load;

FIG. 14 is an illustration of the FEM of the side region showing the stress distribution in response to a shear force and a hoop tension force and further illustrating the side segments of the cutouts oriented in general alignment with the stress concentrations;

FIG. 15 is an illustration of the side region FEM of FIG. 14 and illustrating a lamination path between the cutouts;

FIG. 17 is an illustration of the side region in an embodiment wherein the pad-up region includes staggered pad-up plies;

FIG. 18 is a cross-sectional illustration of the side region taken along line 18 of FIG. 17 and illustrating the progressive increase in skin thickness of the side region due to the arrangement of the pad-up plies;

FIG. 19 is an illustration of the side region and an embodiment of the pad-up region having additional pad-up plies for handling the hoop tension load in the side region;

FIG. 20 is a displacement plot of a shape optimization model of a rounded rectangular cutout and illustrating displacement vectors indicating the tendency of the cutout geometry to evolve into a diamond shape cutout;

FIG. 23 is an illustration of an embodiment of the diamond shaped cutout having curved side segments;

FIG. 24 is an illustration of an embodiment of the diamond shaped cutout with rounded sides;

FIG. 25 is an illustration of an embodiment of the diamond shaped cutout with rounded sides and an increased aspect ratio relative to the aspect ratio of the cutout of FIG. 24;

DETAILED DESCRIPTION

Figure 1A:
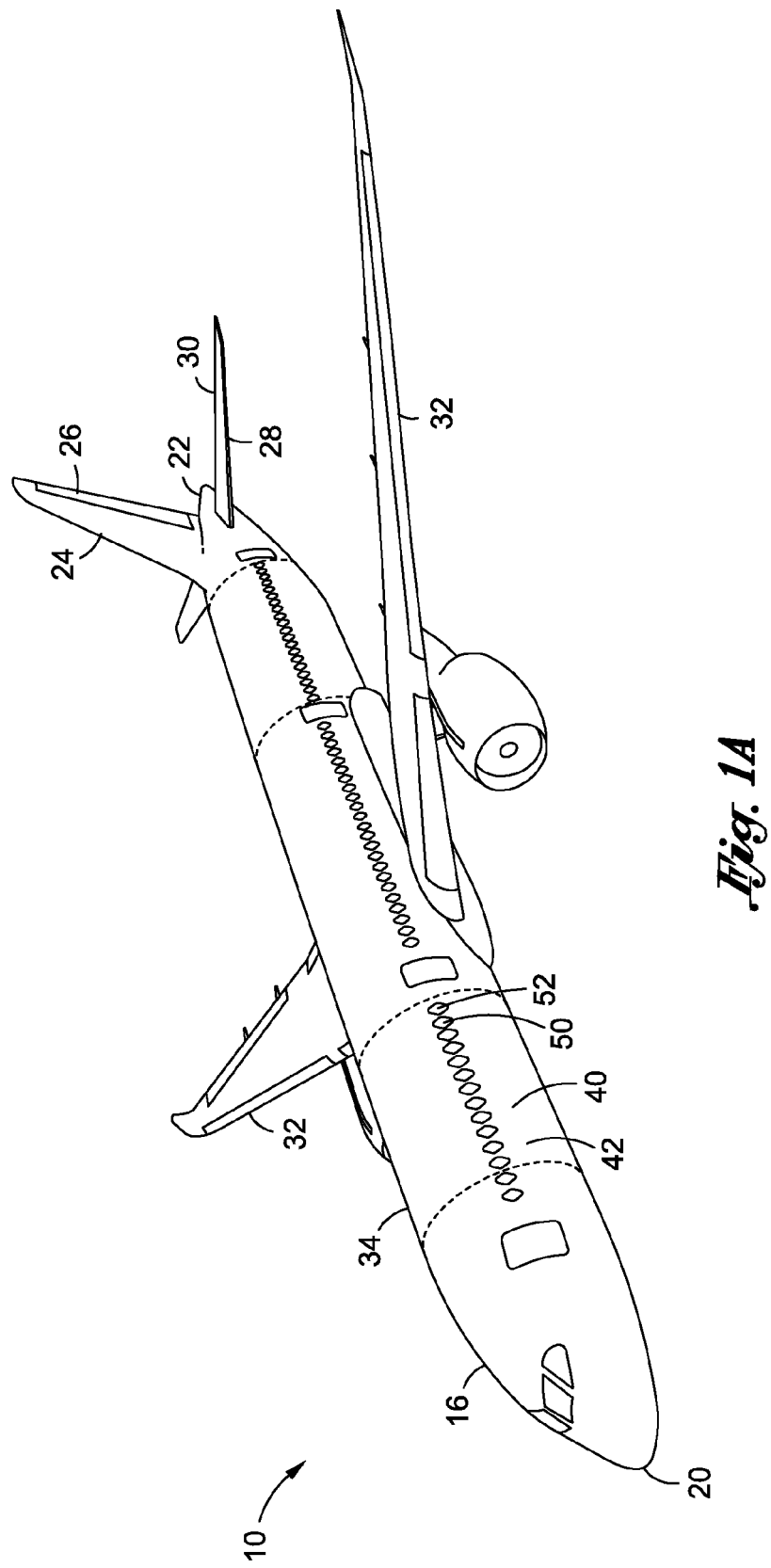
FIG. 1A is a perspective view of an aircraft having a fuselage comprised of a plurality of unitary barrel sections.

Referring now to the drawings wherein the showings are for purposes of illustrating preferred and various embodiments of the disclosure, shown in FIG. 1A is a perspective view of a passenger aircraft 10 having a fuselage 16 and a pair of wings 32 extending outwardly from the fuselage 16. The fuselage 16 extends from the aircraft 10 nose 20 to an empennage 22 at a rear end of the fuselage 16. The empennage 22 may include a horizontal stabilizer 28, an elevator 30, a vertical stabilizer 24, and a rudder 26. The fuselage 16 may include a row of windows 50 extending along each side of the fuselage 16.

The present disclosure includes embodiments of an aircraft 10 fuselage 16 as shown in FIG. 1A having one or more unitary barrel sections 34 with optimized diamond shaped window 50 cutouts 52. Each one of the barrel sections 34 may comprise a skin 42 extending substantially continuously around a circumference of the barrel section 34. The fuselage 16 may include side regions 40 on each side of the barrel section 34. One or more of the window 50 cutouts 52 may be formed in the side regions 40. The window 50 cutouts 52 may be sized and configured to facilitate a direct load path between the cutouts 52.

Figure 1B:
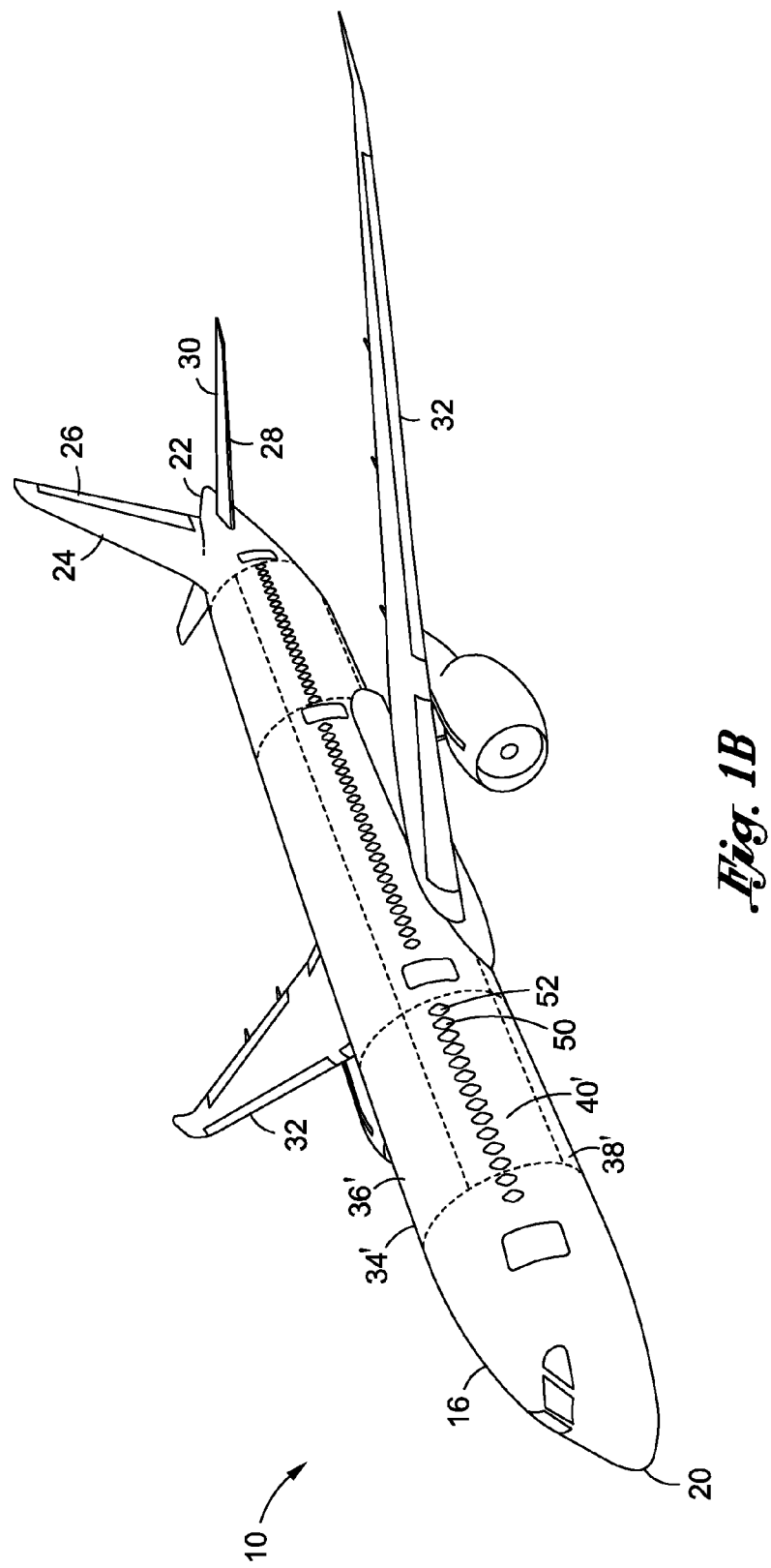
FIG. 1B is a perspective view of an aircraft having a fuselage comprised of a plurality of panels that may be assembled to form at least one barrel section.

Referring to FIG. 1B, shown is the aircraft 10 fuselage 16 in an embodiment comprised of a plurality of panels 36', 38', 40' that may be assembled to form one or more barrel sections 34. For example, the fuselage 16 may include one or more crown panels 36' extending along an upper portion of the fuselage 16, one or more keel panels 38' extending along a bottom portion of the fuselage 16, and side panels 40' extending along the sides of the fuselage 16. The panels 36', 38', 40' may be assembled to form at least one barrel section 34 of the fuselage 16. In the embodiment shown in FIG. 1B, each one of the side panels 40' may include one or more of the optimized diamond shaped window 50 cutouts 52 which may be sized and configured to facilitate a direct load path between the cutouts 52.

The present disclosure also includes a method (FIG. 27) of forming diamond shaped cutouts 52 in a fuselage 16. Additionally, the present disclosure includes embodiments for optimizing a skin thickness (FIG. 18) of the fuselage 16 in areas adjacent to the cutouts 52. Although the present disclosure is described in the context of a fixed wing passenger aircraft 10 as illustrated in FIGS. 1A and 1B, it is contemplated that the disclosed embodiments may be applied to aircraft of any configuration, without limitation. For example, the disclosed embodiments may be applied to any civil, commercial or military aircraft and may include fixed-wing and rotary-wing aircraft. In addition, the embodiments may be applied to alternative aircraft configurations and are not limited to the tube-and-wing aircraft 10 configuration illustrated in FIGS. 1A and 1B. For example, the disclosed embodiments may be applied to hybrid wing-body aircraft (not shown).

The disclosed embodiments may also be applied to any vehicle or structure that is subject to bending loads and which has cutouts 52 formed in the vehicle sides or structure sides. Although the diamond-shaped cutouts 52 are described in the context of passenger windows 50, the disclosed embodiments may also be applied to doors, hatches and other openings that may be formed in a vehicle or structure that is subject to combined bending (FIG. 2) and cabin pressurization loads (FIG. 3). In addition, the embodiments disclosed herein may be applied to structures fabricated of any material type, without limitation, including vehicles and structures fabricated of metallic material, composite material such as fiber-reinforced polymeric material, and combinations of metallic material and composite material.

FIG. 2 is a side view of the aircraft 10 having a plurality of diamond shaped windows 50 extending along the fuselage 16. The fuselage 16 may be subject to a bending moment $M_1$ oriented in the direction shown in FIG. 2. The bending moment $M_1$ may be imposed on the fuselage 16 due to flights loads. For example, under a positive g-loading, the weight of the aircraft 10 supported by the wings 32 results in the bending moment $M_1$ on the fuselage 16. The bending moment $M_1$ may also occur due to maneuver loads, up-gusts, and landing loads. The magnitude of the bending moment $M_1$ is typically highest near the intersection of the wing front spar (not shown) with the fuselage 16 and near the intersection of the wing rear spar (not shown) with the fuselage 16 and generally decreases along respective directions toward the nose 20 and empennage 22.

FIG. 3 is a cross-sectional view of the fuselage 16 divided into four circumferential quadrants including a crown region 36, a keel region 38, and a pair of side regions 40. The crown region 36, keel region 38, and side regions 40 may form part of a unitary barrel section 34 as shown in FIG. 1A. Alternatively, the crown region 36 may be configured as a separate crown panel 36' (FIG. 1B), the keel region 38 may be configured as a separate keel panel 38' (FIG. 1B), and the side regions 40 may each be configured as separate side panels 40' (FIG. 1B) which may be joined to form an assembled barrel section 34' as shown in FIG. 1B. For purposes of the present disclosure, references with regard to the side regions 40 encompass and apply equally to the side panels 40' (FIG. 1B). Likewise, references in the present disclosure to the crown region 36 and the keel region 38 encompass and apply equally to respective ones of the crown panel 36' (FIG. 1B) and the keel panel 38' (FIG. 1B).

Referring still to FIG. 3, the side regions 40 may include one or more of the cutouts 52 for passenger windows 50. A cabin pressurization load P may be applied to the fuselage 16 interior. The cabin pressurization load P represents internal pressurization of the passenger cabin at altitude. The Federal Aviation Administration (FAA) requires that cabin pressure is maintained at a pressure altitude of not greater than 8,000 feet at the normal cruising altitude of an aircraft. With safety factors, the cabin pressurization load P that the fuselage 16 must be capable of withstanding is up to 18.2 psi although the fuselage 16 may be configured to withstand higher pressurization loads. The cabin pressurization load P imposed on the aircraft 10 in FIG. 3 results in a hoop tension load (not shown) oriented in a circumferential direction of the fuselage 16 skin 42 and is represented by $\sigma_{hoop}$ in FIG. 5 as discussed in greater detail below.

FIG. 4 illustrates a barrel section 34 of the fuselage 16 showing the crown region 36, the keel region 38, and the pair of side regions 40. The barrel section 34 may include the skin 42 supported by a plurality of circumferentially-spaced stringers 46 and a plurality of axially-spaced frames 48. The stringers 46 may carry axial forces such as axial tension loads due to cabin pressurization P (FIG. 3). The frames 48 may maintain the shape of the fuselage 16. The frames 48 may also enhance the buckling strength of the fuselage 16 under bending. The stringers 46 and frames 48 may collectively increase the bending stiffness of the skin 42. The skin 42 may include a plurality of the cutouts 52 positioned in side-by-side arrangement along a window belt 49. FIG. 4 illustrates several of the primary loads that occur in the regions 36, 38 due to the bending moment $M_1$ (FIG. 2) on the fuselage 16. For example, the crown region 36 may be loaded primarily in tension T, the keel region 38 may be loaded primarily in compression C, and each one of the side regions 40 may be loaded primarily in shear as shown in FIG. 5. The tension load T in the crown region 36 and the compression load C in the keel region 38 are oriented parallel to a longitudinal axis 12 of the aircraft 10.

FIG. 4A illustrates a portion of the side region taken from the barrel section of FIG. 4. The portion shown in FIG. 4A may represent the side region 40 at a location of the fuselage 16 (FIG. 4) forward of the wing-fuselage 32, 16 (FIG. 1A) intersection. The portion of the side region 40 in FIG. 4A includes a pair of the diamond shaped cutouts 52 formed in the skin 42 in side-by-side relation to one another.

FIG. 5 illustrates a representative element 41 of the side region 40 taken from a location between the cutouts 52 (FIG. 4A). The representative element 41 is provided to illustrate the orientation of stresses in the side region 40. For example, shear stress $\tau_{shear-1}$ components occur in the side region 40 as a result of the downward bending moment $M_1$ (FIG. 2). The magnitude of the shear stress $\tau_{shear-1}$ may correspond to the magnitude of the bending moment $M_1$ (FIG. 2) which is typically highest near the intersection of the wing spars (not shown) with the fuselage 16 (FIG. 2) and generally decreases along a direction away from the wing 32 (FIG. 2). The cabin pressurization load P (FIG. 3) results in a hoop tension stress $\sigma_{hoop}$ occurring in the representative element 41 of the side region 40. The hoop tension stress $\sigma_{hoop}$ is shown oriented parallel to the circumferential axis 14. The magnitude of the hoop tension stress $\sigma_{hoop}$ is generally constant along the length of the fuselage 16 (FIG. 2).

FIG. 6 is a further illustration of the representative element 41 of the side region 40 showing the tension component of the shear load path $N_{shear-1}$ as a result of the bending moment $M_1$ (FIG. 2). In this regard, the shear load in the side region 40 due to the bending moment $M_1$ also has a compression component (not shown) which may be oriented generally perpendicular to the orientation of the tension component of the shear load. For purposes of the present disclosure, references to the shear load path $N_{shear-1}$ are in relation to the tension component of the shear load in the side region 40. In FIG. 6, the shear load path $N_{shear-1}$ is shown oriented at a shear load angle $\alpha_{shear-1}$ of approximately +45 degrees relative to the longitudinal axis 12. As was indicted earlier, the orientation of the shear load path $N_{shear-1}$ is dependent upon the location along the fuselage 16 (FIG. 4) and on the direction of the bending moment. The bending moment $M_1$ in FIG. 2 may be described as negative under normal convention. FIG. 6 also illustrates the hoop tension load path $N_{hoop}$ which is oriented parallel to the circumferential axis 14.

FIG. 7 is an illustration of the representative element 41 of the side region 40 showing the orientation of a resultant load path $N_{result-1}$ which is the resultant of the combination of the shear load path $N_{shear-1}$ (FIG. 6) and the hoop tension load path $N_{hoop}$ (FIG. 6). The shear load path $N_{shear-1}$ (FIG. 6) and the hoop tension load path $N_{hoop}$ (FIG. 6) are additive in the sense that the resultant (i.e., the combination) of the shear load and the hoop tension load is generally of greater magnitude than either the shear load or the hoop tension load acting alone. The resultant of the shear load and the hoop tension load comprise the principal stress (not shown) acting on the side region 40. The resultant load path $N_{reset-1}$ is oriented at a resultant load angle $\alpha_{result-1}$. The resultant load angle $\alpha_{result-1}$ represents the orientation of the principal stress (not shown) in the side region 40.

The resultant load angle $\alpha_{result-1}$ may vary between the shear load angle $\alpha_{shear-1}$ of +45 degrees (FIG. 6) and the circumferential axis 14. In an embodiment, the resultant load path $N_{result-1}$ may be oriented at a resultant load angle $\alpha_{result-1}$ of approximately +60 degrees relative to the longitudinal axis 12. The orientation of the resultant load path $N_{reset-1}$ may be dependent upon the magnitude and direction of the shear load, the hoop tension load, and additional or other loads that may be acting on the fuselage 16 (FIG. 4). Such additional loads may include, but are not limited to, torsional loads in the fuselage 16 caused by movement of the rudder 26 (FIGS. 1A-1B) and/or elevator 30 (FIGS. 1A-1B) during maneuvering of the aircraft 10 (FIGS. 1A-1B).

FIG. 8 is a side view of the aircraft 10 illustrating a bending moment $M_2$ acting on the fuselage 16. The direction of the bending moment $M_2$ is opposite the direction of the bending moment $M_1$ of FIG. 2. The bending moment $M_2$ in FIG. 8 may be described as positive under normal convention. The bending moment $M_2$ in FIG. 8 may occur in response to a negative g-loading on the aircraft 10. Negative g-loading may occur during aircraft 10 maneuvering or as a result of turbulence or a down-gust on the aircraft 10.

FIG. 9 is an illustration of a representative element 41 of the side region 40 taken from a location of the side region 40 between the pair of the cutouts 52 indicated in FIG. 8. Due to the direction of the bending moment $M_2$ (FIG. 8), the shear stress $\tau_{shear-2}$ components are oriented in mirror image to the orientation of the shear stress $\tau_{shear-1}$ components in FIG. 5. The cabin pressurization load P (FIG. 3) results in the hoop tension stress $\sigma_{hoop}$. The hoop tension stress $\sigma_{hoop}$ is oriented parallel to the circumferential axis 14.

FIG. 10 illustrates the orientation of the shear load path $N_{shear-2}$ resulting from the bending moment $M_2$ (FIG. 8) on the fuselage 16 (FIG. 8). The shear load path $N_{shear-2}$ is oriented at a shear load angle $\alpha_{shear-2}$ of a approximately –45 degrees relative to the longitudinal axis 12. The orientation of the shear load path $N_{shear-2}$ corresponds to the orientation of the shear stress $\tau_{shear-2}$ components shown in FIG. 9. FIG. 10 also illustrates the orientation of the hoop tension load path $N_{hoop}$ which is parallel to the circumferential axis 14.

FIG. 11 is an illustration of the representative element 41 of the side region 40 showing the load path $N_{result-2}$ of the resultant of the combination of the shear load path $N_{shear-2}$ (FIG. 10) and the hoop tension load path $N_{hoop}$ (FIG. 10). The resultant load path $N_{result-2}$ is oriented at the resultant load angle $\alpha_{result-2}$ which may vary between the circumferential axis 14 and the shear load angle $\alpha_{shear-2}$ (FIG. 10).

FIG. 12 is a side view of a portion of the side region 40. The side region 40 shown in FIG. 12 represents a portion of the window belt 49 and includes a first cutout 52a having a diamond shape and a second cutout 52b which also has a diamond shape. The first and second cutouts 52a, 52b are formed in the skin 42 in side-by-side relation to one another. The diamond shape of the first and second cutouts 52a, 52b allows for a direct and continuous load path between the first and second cutouts 52a, 52b. For example, FIG. 12 illustrates the resultant load paths $N_{result}$ extending substantially continuously from the lower portion 76 of the side region 40 generally under the first cutout 52a to the upper portion 74 of the side region 40 generally over the second cutout 52b. The lower portion 76 of the side region 40 comprises the portion of the side region 40 that is below a lowest position of the first and second cutouts 52a, 52b. The upper portion 74 of the side region 40 comprises the portion of the side region 40 that is above a highest position of the first and second cutouts 52a, 52b.

The skin 42 of the side region 40 of FIG. 12 may be formed of composite material having a plurality of reinforcing fibers 44 which may be embedded within a matrix. The fibers 44 of the skin 42 are preferably arranged such that at least a portion of the fibers 44 are oriented in substantially parallel relation to the resultant load paths $N_{result}$. The fibers 44 may also be oriented substantially parallel to other load paths. For example, a portion of the fibers 44 may be substantially parallel to the hoop tension load path $N_{hoop}$ which is aligned with the circumferential axis 14. By orienting the fibers 44 of the skin 42 substantially parallel to the load paths, the fibers 44 may efficiently carry tension load. In an embodiment, the fibers 44 may be oriented at a fiber angle $\alpha_{fiber}$ of between approximately +50 degrees and +75 degrees relative to the longitudinal axis 12 or at angles less than +50 degrees and greater than +75 degrees. The fibers 44 may also be oriented at a fiber angle $\alpha_{fiber}$ of between approximately –50 degrees and ––75 degrees relative to the longitudinal axis 12 or at angles less than –50 degrees and greater than –75 degrees. For example, the fibers 44 may additionally be substantially parallel to the shear load path (not shown) which may be oriented at +/–45 degrees relative to the longitudinal axis 12. A portion of the fibers 44 may also be oriented generally parallel to the circumferential axis 14.

The fibers 44 in FIG. 12 may extend at least from a position generally below a lower end 60b of the first cutout 52a to a position generally above an upper end 60a of the second cutout 52b. Likewise, the fibers 44 may extend from a position generally below the lower end 60b of the second cutout 52b to a position generally above and the upper end 60a of the first cutout 52a. The skin 42 may also include fibers 44 that are oriented along other directions that are not shown. The fibers 44 may be continuously wound around the circumference of the barrel section 34 (FIG. 4) or the fibers 44 may have a finite length and may terminate at any circumferential position on the barrel section 34 including at any position within the window belt 49.

The diamond shape of the cutouts 52 illustrated in FIG. 12 may include four side segments 58 oriented at a side segment angle $\theta_b$ measured relative to the minor axis b. The side segments 58 are preferably, but optionally, oriented substantially parallel to one or more load paths. For example, the side segments 58 may be oriented substantially parallel to the resultant load paths $N_{result}$ and/or substantially parallel to the hoop tension load path $N_{hoop}$. However, the side segments 58 may be oriented in any direction including a direction generally parallel to the shear load paths $N_{shear-1}$, $N_{shear-2}$ (FIGS. 6, 10). In this regard, the side segments 58 may be oriented at any angle between the directions of the shear load paths $N_{shear-1}$, $N_{shear-2}$ (FIGS. 6, 10). For example, the side segments 58 may be oriented at any side segment angle $\theta_b$ between approximately +45 degrees relative to the longitudinal axis 12 and −45 degrees relative to the longitudinal axis 12 although angles outside of the +/−45 degree range are contemplated.

Referring still to FIG. 12, the positioning and orientation of the cutouts 52 in the side region 40 may be defined with regard to the major axis a and the minor axis b of each cutout 52. In an embodiment, each one of the cutouts 52 may be arranged such that the major axis a of the cutout 52 is oriented substantially parallel to the circumferential axis 14 of the aircraft 10. The cutouts 52 in the side region 40 may be spaced apart from one another at a pitch distance 72. The pitch distance 72 may be defined as the distance from the intersection of the major and minor axes a, b of one cutout 52 to the intersection of the major and minor axes a, b of an adjacent cutout 52. In an embodiment, the cutouts 52 may be spaced apart by a pitch distance 72 of from approximately 18 to 28 inches and, more preferably, by a pitch distance 72 of between approximately 22 to 24 inches.

FIG. 13 is a diagram 100 of loads and boundary conditions that may be applied to a finite element model 120 (FIG. 14) of the side region 40 portion (FIG. 12) for simulating and predicting the structural response of the side region 40 to a shear load (not shown) and a hoop tension load (not shown) acting on the fuselage 16 (FIG. 2). The diagram 100 includes the first and second cutouts 52a, 52b and has a top boundary 102, a bottom boundary 104, a forward boundary 106, and an aft boundary 108. The top boundary 102 includes a plurality of constraints 110 for constraining the top boundary 102 against translation along the x, y and z axes and against rotation about the respective x, y and z axes. A reference coordinate system RCS is illustrated at the bottom left corner of the diagram 100 in FIG. 13. The bottom boundary 104, the forward boundary 106, and the aft boundary 108 are unconstrained.

In the diagram 100, a shear force $F_{shear}$ of 800 pounds/inch (lb/in) is applied to the forward boundary 106 and the aft boundary 108 to simulate the shear stress (not shown) occurring in the side region 40 (FIG. 12) due to a bending moment (not shown) on the fuselage 16 (FIGS. 1A-1B). The orientation of the shear force $F_{shear}$ in FIG. 13 is similar to the orientation of the shear stress $\tau_{shear-1}$ components of FIG. 5 resulting from the bending moment $M_1$ (FIG. 2). In FIG. 13, a hoop tension force $F_{hoop}$ of 1200 lb/in is applied to the bottom boundary 104 to simulate in-plane hoop tension due to cabin pressurization. The orientation of the hoop tension force $F_{hoop}$ in FIG. 13 is similar to the orientation of the hoop tension stress $\sigma_{hoop}$ in FIG. 5.

FIG. 14 is an illustration of an FEM 120 comprising an element mesh 122 of the side region 40 (FIG. 12). The element mesh 122 includes the first and second cutouts 52a, 52b which have a diamond shape. FIG. 14 illustrates stress contours 128 of a von Mises stress 126 distribution in the side region 40 in response to application of the shear force $F_{shear}$ (FIG. 13) and the hoop tension force $F_{hoop}$ (FIG. 13). The stress contours 128 separate the stress levels by relative stress magnitude 124. As shown in FIG. 14, relatively high magnitude stress concentrations 130 of approximately 47 ksi maximum occur in a relatively narrow strip along one side segment 58 of each of the first and second cutouts 52a, 52b. However, the 47 ksi stress concentrations along the diamond shape cutouts 52a, 52b were determined to be 35 percent lower than stress concentrations of approximately 70 ksi that occurred along conventional oval-shaped cutouts (not shown) in an equivalent FEM (not shown) subject to similar loads and boundary conditions.

FIG. 14 also illustrates intermediate magnitude stress concentrations 132 extending from the lower portion 76 of the first cutout 52a toward the upper portion 74 of the second cutout 52b. Low magnitude stress concentrations 134 are illustrated in the remainder of the FEM 120 plot. The intermediate magnitude stress concentrations 132 extend along the same direction as at least one side segment 58 of each diamond-shaped cutout 52a, 52b. The shape of the intermediate magnitude stress concentrations 132 corresponds to the direction of a resultant load path $N_F$ of the shear force $F_{shear}$ (FIG. 13) and the hoop tension force $F_{hoop}$ (FIG. 13).

FIG. 15 is an illustration of the FEM solution similar to the FEM of FIG. 14 and further illustrating a lamination path 90 that may be implemented during fabrication of a unitary composite barrel section 34 (FIG. 1A). The lamination path 90 may also be implemented during fabrication of side panels 40' (FIG. 1B) that may be assembled with a crown panel 36' (FIG. 1B) and a keel panel 38' (FIG. 1B) to form an assembled barrel section 34' (FIG. 1B). The lamination path 90 provides for a relatively large width of a composite tape (not shown) that may be applied in a single pass such as by a tape laying machine (not shown). The relatively large width of the lamination path 90 may reduce the total amount of time required for laying up a barrel section 34 (FIG. 4) by reducing the total number of passes required by a tape application head (not shown) of a tape lamination machine (not shown). In addition, the side edges of the lamination path 90 butt up against the straight side segments 58 of the diamond shaped cutouts 52a, 52b eliminating the need for special tape trimming or cutting operations.

Figure 16:
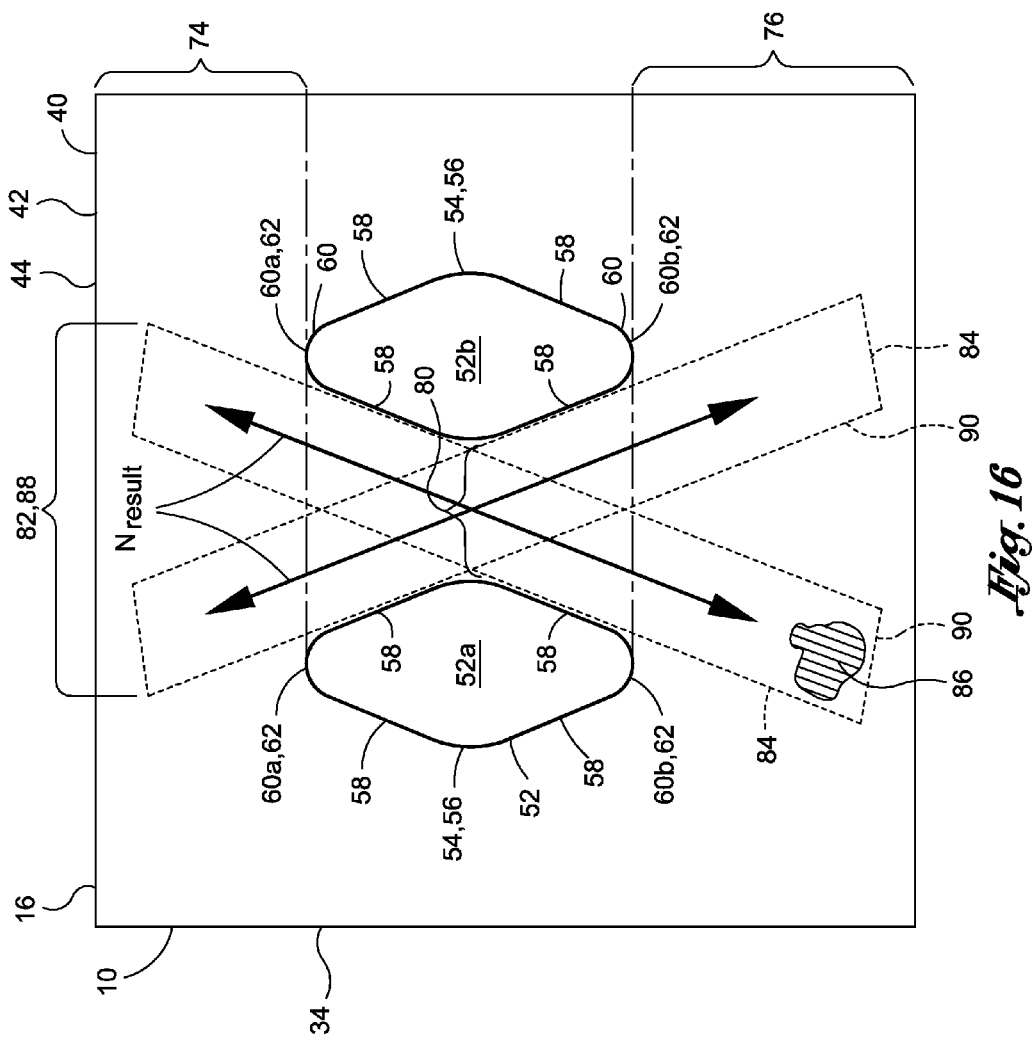
FIG. 16 is an illustration of an embodiment of a pad-up region comprised of pad-up plies incorporated into the side region and formed in an X-shape generally aligned with the illustrated load paths.

FIG. 16 illustrates an embodiment of the side region 40 having a pad-up region 82 generally located in an area of the side region 40 between the cutouts 52. The pad-up region 82 may extend below and/or above the first and second cutouts 52a, 52b. The pad-up region 82 represents an increase in the thickness of the side region 40 from a nominal skin thickness $t_{nom}$ (FIG. 18) of the side region 40. The skin 42 of the side region 40 may be formed of metallic material or composite material. Suitable metallic material may include aluminum, titanium, aluminum-lithium and other suitable metallic materials or combinations of material. The pad-up region 82 for a metallic skin 42 may comprise an increase in the combined thickness of the metallic skin.

For skin 42 formed of composite material, the pad-up region 82 may be comprised of one or more pad-up plies 84 of composite material that may be laminated over the skin 42 in a lamination scheme 88. FIG. 16 illustrates the pad-up plies 84 arranged in an X-shape. The pad-up plies 84 may contain pad-up ply fibers 86 that may be oriented along a direction generally parallel to one or more load paths in the side region 40. The pad-up plies 84 may also be oriented generally parallel to the side segments 58 of the cutouts 52 which may coincide with the orientation of one or more of load paths.

FIG. 17 illustrates an optional lamination scheme 88 for laying up pad-up plies 84 in the pad-up region 82. The pad-up plies 84 are shown arranged in staggered X-shapes which pass through a throat 80 of the side region 40. The throat 80 may be defined as the general location of the shortest distance between an adjacent pair of the cutouts 52. Each pad-up ply 84 may be oriented parallel to a load path. The lamination scheme 88 results in a gradual or progressive increase in the skin 42 thickness of the side region 40 along a general direction from the upper portion 74 of the side region 40 toward the throat 80. The lamination scheme 88 also results in a progressive increase in the skin 42 thickness along a general direction from the lower portion 76 of the side region 40 toward the throat 80. The X-shaped lamination scheme 88 may additionally result in the skin 42 thickness that is at a maximum in the throat 80 which advantageously may coincide with a location of maximum stress.

FIG. 18 shows a cross section of the side region 40 illustrating the progressive increase in skin thickness $t_{pad}$ of the side region 40 due to the arrangement of the pad-up plies 84. The pad-up plies 84 result in a progressive increase in thickness of the side region 40 from a nominal skin thickness $t_{nom}$ to an increased skin thickness $t_{pad}$ of the pad-up region 82. The progressive increase in skin thickness $t_{pad}$ allows for efficient transfer of load through the area of the side region 40 between the cutouts 52 (FIG. 17). Advantageously, the progressive increase in skin thickness $t_{pad}$ illustrated in FIG. 18 may reduce interlaminar stresses within the skin 42 which may reduce the potential for delamination of plies.

FIG. 19 illustrates a further embodiment of a lamination scheme 88 for laying up pad-up plies 84 in the pad-up region 82. The lamination scheme 88 includes pad-up plies 84 that are oriented at a shallow angle relative to the circumferential axis 14 (FIG. 12). The additional pad-up plies 84 may be added to handle the hoop tension load (not shown) caused by cabin pressurization P (FIG. 3). In this regard, the additional pad-up plies 84 may be oriented at an angle that approaches the hoop tension load path $N_{hoop}$. The additional pad-up plies 84 may be staggered to facilitate a progressive increase in skin thickness $t_{pad}$ (FIG. 18) toward the throat 80.

FIG. 20 is a displacement plot 160 of a shape optimization model of a rounded rectangular cutout 162 which is shown in dashed. The constraints of the shape optimization model included maintaining the area of the cutout 162 at a predetermined value (e.g., 100 square inches). In addition, the geometry of the rounded rectangular cutout 162 was constrained to be no smaller than a predetermined height and no smaller than a predetermined width. The maximum stress in the side region 40 portion was constrained to be within a predetermined range of the allowable stress 170 of the material. The displacement plot 160 illustrates the stress contours 174 of the relative stress magnitudes 166 at different locations along the cutout 162 edges. The displacement vectors 164a illustrate the tendency of the corners 162a of the rounded rectangular cutout 162 to shift inwardly and away from areas of relatively high stress magnitude 168 of 71 ksi (i.e., magnitudes higher than the material allowable stress indicated by reference number 170). The displacement vectors 164b illustrate the tendency of the sides 162b and the upper and lower ends 162c of the rounded rectangular cutout 162 to shift outwardly and toward the areas of relatively low stress magnitude 172 (i.e., magnitudes lower than the material allowable stress 170). In the shape optimization model, the combination of movements along the displacement vectors 164a, 164b resulted in the rounded rectangular cutout 162 evolving into a diamond shaped cutout (FIG. 22).

Figure 21:
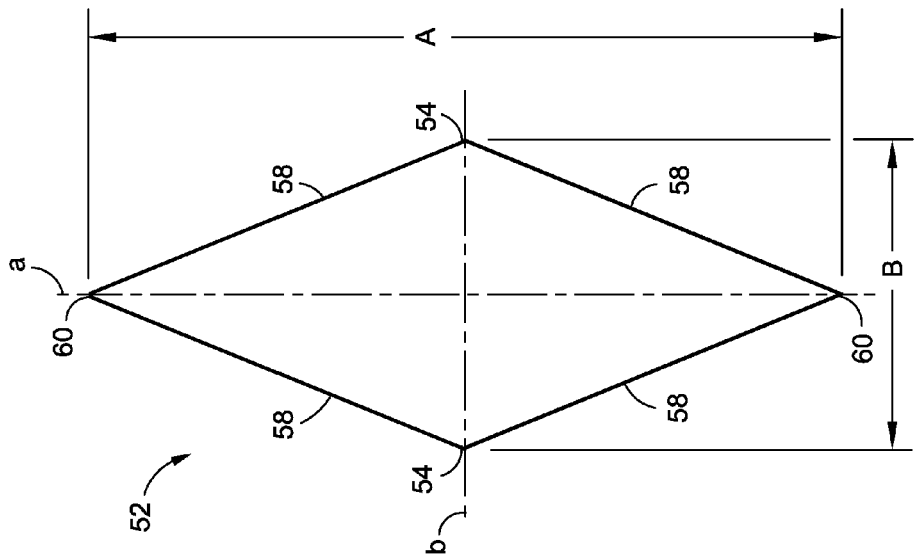
FIG. 21 is an illustration of the diamond shaped cutout having straight side segments.

FIG. 21 is an illustration of the diamond shaped cutout 52 having straight side segments 58 intersecting at the sides 54 and the ends 60. The size and shape of the cutout 52 may be defined with regard to the major axis a and the minor axis b. For example, the height A of the cutout 52 is measured along the major axis a between the intersections of the side segments 58 at the opposing ends 60. The width B is measured along the minor axis b between the intersections of the side segments 58 at the opposing sides 54. The cutout 52 may have a height-to-width A, B aspect ratio of no less than approximately 1.3:1. In an embodiment, the diamond shaped cutout 52 may have a height-to-width A, B aspect ratio defined by the expression, 1.3B≤A≤5B. In this regard, the height A may range in size from approximately 1.3B to approximately 5B. In a preferred embodiment, the aspect ratio of the cutout 52 is between approximately 2:1 and 5:1 although the aspect ratio may be larger than 5:1. In a further embodiment, the cutout 52 may have a height-to-width A, B aspect ratio of from approximately 1.8:1 to 2.2:1. Each one of the cutouts 52 may have an area of from approximately 100 to 300 square inches although the cutout 52 may be provided in an area less than 100 square inches or greater than 300 square inches. In a preferred embodiment, the cutout 52 may have an area in the range of from approximately 120-140 square inches.

Figure 22:
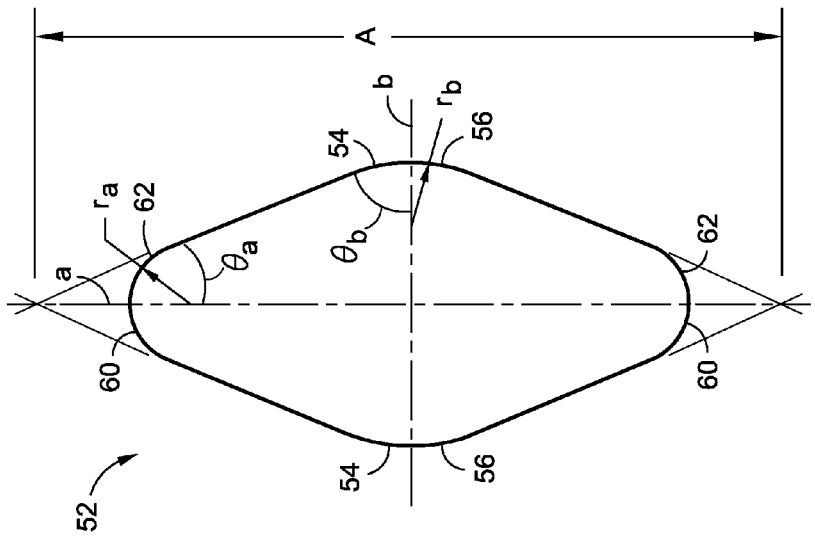
FIG. 22 is an illustration of the diamond shaped cutout having rounded end corners of radius $r_a$ and rounded side corners of radius $r_b$.

FIG. 22 illustrates the ends 60 of the diamond shaped cutout 52 having rounded end corners 62 of radius $r_a$ and the sides 54 having rounded side corners 56 of radius $r_b$. The side radii $r_b$ at the side corners 56 may be larger than the end radii $r_a$ at the end corners 62 to minimize stress concentrations at the sides 54. The end radii $r_a$ and/or side radii $r_b$ may be sized as a function of the height A of the cutout 52. For example, in a preferred embodiment, the end radii $r_a$ may range in size from approximately 0.05 times the height A of the cutout 52 up to approximately 0.50 times the height A. The side radii $r_b$ may range in size from approximately 0.05 times the height A of the cutout 52 up to approximately 3.0 times the height A of the cutout 52. However, the end radii $r_a$ and/or side radii $r_b$ may be provided in sizes larger or smaller than the above noted sizes. The side segments 58 may be oriented at the side segment angle $\theta_b$ measured relative to the minor axis b. The side segment angle $\theta_b$ may range from approximately 50 degrees to 80 degrees although angles outside of the 50-80 degree range are contemplated.

FIG. 23 is an illustration of a curved side diamond shape embodiment 300 of the cutout 52 (FIGS. 1A-1B) having curved side segments 316. The illustrated embodiment 300 may has have a height 306 measured along the major axis and extending between the intersections of a straight line 320 between tangents 314 to the end radius $r_{end\text{-}300}$ and the side radius $r_{side\text{-}300}$ at each end corner 310 of the embodiment 300. The width 308 may be measured along the minor axis 304 and extending between the intersections of the straight line 320 between tangents 314 to the end radius $r_{end\text{-}300}$ and the side radius $r_{side\text{-}300}$ at each side corner 312. The embodiment 300 may have a height-to-width 306, 308 aspect ratio of approximately 1.8:1 to 2.2:1, and side radii $r_{side\text{-}300}$ at the side corners 312 that are larger than the end radii $r_{end\text{-}300}$ at the end corners 310. The curved side diamond shape embodiment 300 may have an area of approximately 120-140 square inches. The curved side segments 316 may have a convex curvature wherein each curved side segments 316 is tangent to the corresponding end radius $r_{end\text{-}300}$ and the side radius $r_{side\text{-}300}$. The degree of curvature of each side segments 316 may be defined relative to the straight line 320 extending between the tangents 314. The curvature 318 of each side segment 316 may be such that a maximum distance from the curved side segment 316 to the straight line 320 is no greater than approximately 20 percent of the straight line 320 distance between the tangents 314. Advantageously, the curvature of the curved side segments 316 may accommodate multiple load paths (not shown) having different orientations.

FIG. 24 is an illustration of a standard rounded diamond shape embodiment 400 of the cutout 52 (FIGS. 1A-1B) having rounded sides 412 of substantially constant curvature. The rounded sides 412 may extend between the upper and lower end corners 410 and may be tangent to the end corners 410. The standard rounded diamond shape embodiment 400 may have a height 406 measured along the major axis 402 and extending between the intersections of extensions lines extending from the tangent 414 at the rounded side 412 and end corner 410 on each side of the end corners 410. The embodiment 400 may have a width 408 measured along the minor axis 404 and extending between the intersections of the minor axis 404 with the rounded sides 412 of the embodiment 400. The embodiment 400 may have a height 406 of approximately 16-18 inches, a height-to-width 406, 408 aspect ratio of approximately 1.5:1 to 1.9:1, and an area of approximately 125-135 square inches.

FIG. 25 is an illustration of an enhanced rounded diamond shape embodiment 500 of the cutout 52 (FIGS. 1A-1B) having rounded sides 512 of substantially constant curvature. The rounded sides 512 may extend between the upper and lower end corners 510 and may be tangent to the end corners 510. The embodiment 500 may have a height 506 measured along the major axis 502 and extending between the intersections of extensions lines extending from the tangent 514 at the rounded side 512 and end corner 510 on each side of the end corners 510. The embodiment 500 may have a width 508 measured along the minor axis 504 and extending between the intersections of the minor axis 504 with the rounded sides 512 of the embodiment 500. The enhanced rounded diamond shape embodiment 500 may have a height 506 of approximately 22-26 inches, an aspect ratio of approximately 2:1 to 2.4:1, and an area of approximately 190-210 square inches.

Figure 26:
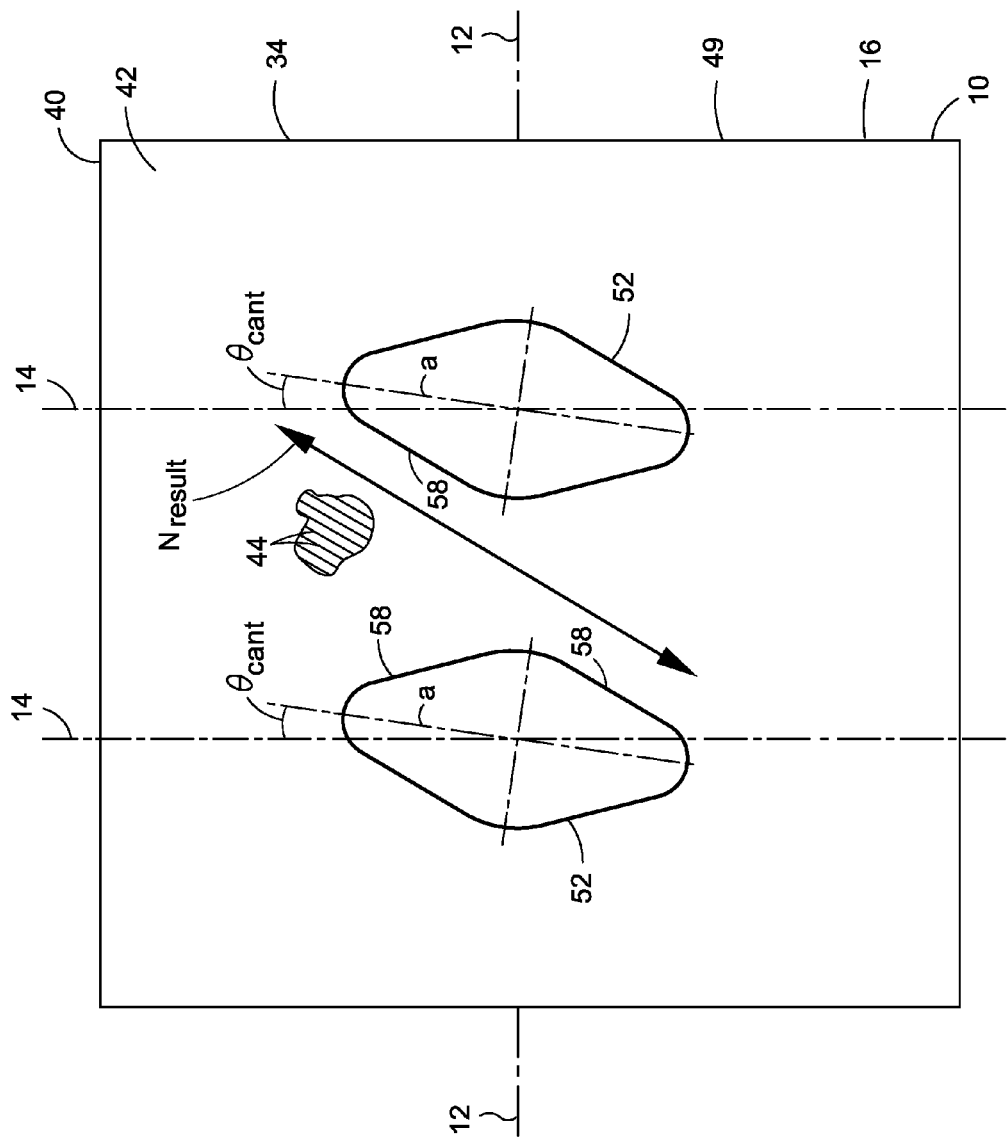
FIG. 26 is an illustration of an embodiment of the cutouts being canted relative to the circumferential axis of the aircraft.

FIG. 26 is an illustration of an embodiment of the cutouts 52 being canted relative to the circumferential axis 14 of the aircraft 10. In the embodiment shown, the cutouts 52 are oriented such that the major axis a of each cutout 52 is oriented at an angle $\theta_{cant}$ relative to the circumferential axis 14 of the aircraft 10. The cutouts 52 may optionally be canted at the angle $\theta_{cant}$ in either direction (e.g., canted forward or canted aftward) relative to the circumferential axis 14. In an embodiment, the cutouts 52 may be oriented such that the major axis a is oriented within +/−20 degrees of the circumferential axis 14 of the aircraft although the cutouts may be oriented at angles greater than +/−20 degrees. The angle $\theta_{cant}$ of orientation of any given cutout 52 may be such that at least one of the side segments 58 of the cutout 52 is oriented substantially parallel to a resultant load path $N_{result}$, substantially parallel to the hoop tension load path $N_{hoop}$ (FIGS. 6, 10), or substantially parallel to one of the shear load paths $N_{shear-1}$, $N_{shear-2}$ (FIGS. 6, 10) or any other load path.

The angle $\theta_{cant}$ of orientation may further be selected such that two or more of the side segments 58 of a given cutout 52 are oriented substantially parallel to one of the resultant load paths $N_{result-1}$, $N_{result-2}$ (FIGS. 7, 11), the hoop tension load path $N_{hoop}$ (FIGS. 6, 10), one of the shear load paths $N_{shear-1}$, $N_{shear-2}$ (FIGS. 6, 10), or at any other load path orientation. For example, a cutout 52 may be oriented such that one of the side segments 58 of the cutout 52 is oriented substantially parallel to the resultant load path $N_{result-1}$ (FIG. 7) of the hoop tension load path $N_{hoop}$ (FIG. 6) and the tension component of the shear load path $N_{shear-1}$ (FIG. 6). Another side segment 58 of the same cutout 52 may be oriented substantially parallel to the resultant load path (not shown) of the combination of the hoop tension load path $N_{hoop}$ (FIG. 7) and the compression component (not shown) of the shear load (not shown).

Further in this regard, the skin 42 may include fibers 44 that may be oriented in substantial alignment with the resultant load path $N_{result}$ (FIG. 7) of the hoop tension load path $N_{hoop}$ (FIG. 6) and the tension component of the shear load paths $N_{result-1}$, $N_{result-2}$ (FIGS. 7, 11) and may further include fibers 44 oriented substantially parallel to the resultant load path (not shown) of the combination of the hoop tension load path $N_{hoop}$ (FIG. 6) and the compression component (not shown) of the shear load path (not shown). The fibers 44 may be oriented in a manner representing a truss structure (not show) extending along the window belt 49. For example, a portion of the fibers 44 may be oriented at angles of between approximately +45 degrees and +80 degrees relative to the longitudinal axis 12 and another portion of the fibers 44 may be oriented at angles (not shown) of between approximately +100 degrees and +160 degrees relative to the longitudinal axis 12. In an embodiment, a portion of the fibers 44 may be oriented at approximately +60 degrees relative to the longitudinal axis 12 and another portion of fibers 44 may be oriented at approximately +150 degrees relative to the longitudinal axis 12 representing a skewed truss arrangement (not shown) along the window belt 49. The angle $\theta_{cant}$ of orientation of the cutouts 52 may be constant along the length of the fuselage 16 or the angle $\theta_{cant}$ may vary along the length of the fuselage 16.

Figure 27:
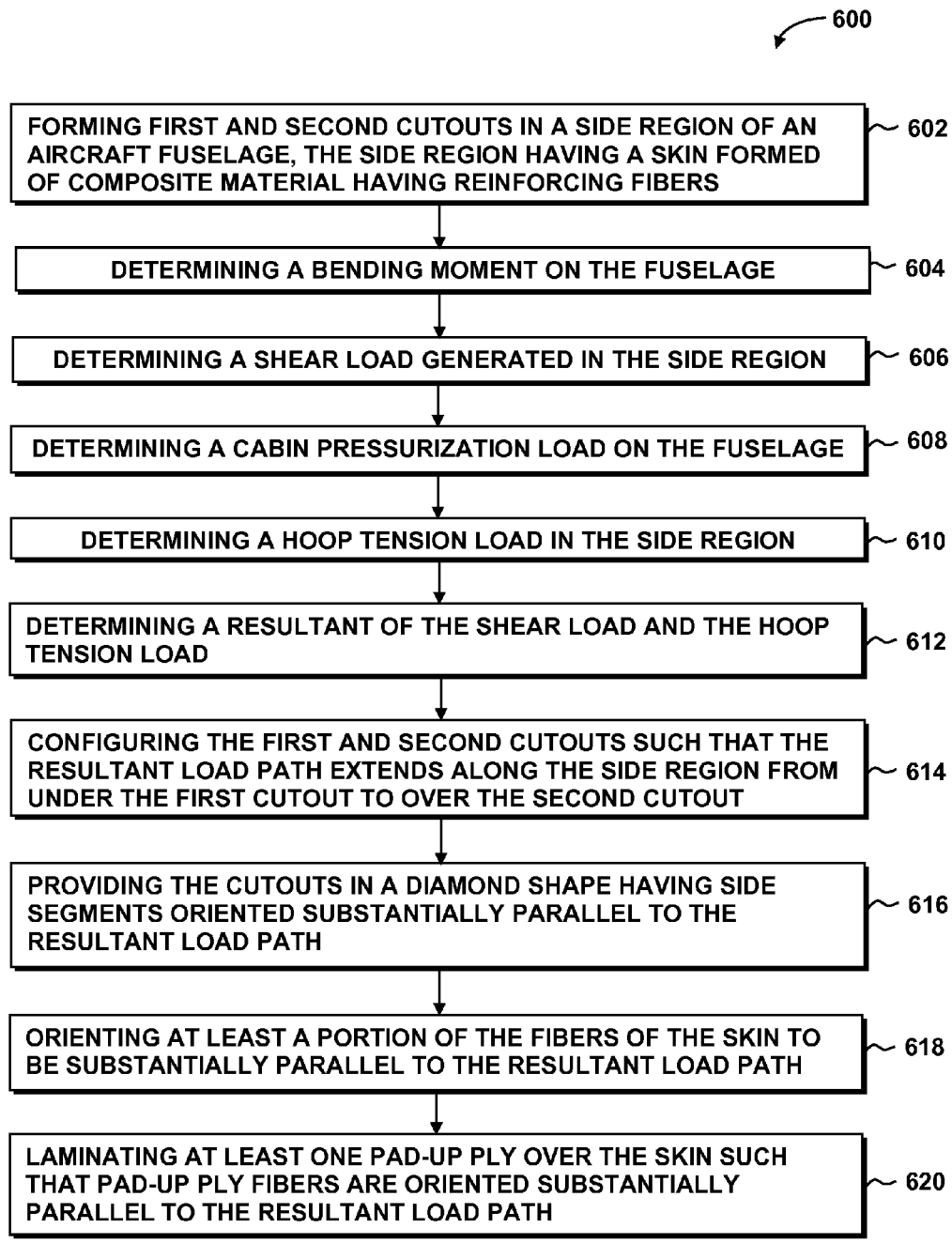
FIG. 27 is an illustration of a flow diagram representing one or more operations that may be included in a methodology of forming a cutout in a fuselage.

FIG. 27 illustrates a flow diagram representing one or more operations that may be included in a methodology 600 for forming cutouts 52 (FIG. 12) in at least one of the side regions 40 (FIG. 12) of an aircraft 10 fuselage 16 (FIG. 12). Step 602 of the method may comprise forming the cutouts 52 (FIG. 12) in the side region 40 in side-by-side relation to one another. The cutouts 52 may be spaced apart from one another at a desired pitch distance 72 (FIG. 12). The pitch distance 72 may optionally correspond to the spacing between passenger seats (not shown) of the aircraft 10 (FIGS. 1A-1B). For example, the pitch distance 72 may be in the range of from approximately 18 to 28 inches.

Step 604 may comprise determining the bending moment $M_1$ (FIG. 2) acting on the fuselage 16 (FIG. 12). Although the methodology 600 is described in the context of the negative bending moment $M_1$ illustrated in FIG. 2, the methodology may also be practiced using the positive bending moment $M_2$ illustrated in FIG. 8. The bending moment $M_1$ (FIG. 2) may be determined by predicting the loads on the fuselage 16 (FIG. 12) in a computer simulation. The bending moment $M_1$ (FIG. 2) may also be determined by measuring the loads on the fuselage 16 (FIG. 12) during static testing or by directly measuring loads on the fuselage 16 during flight testing.

Step 606 may comprise determining the shear load (not shown) generated in the side region 40 (FIG. 12) in response to the bending moment $M_1$ (FIG. 2) acting on the fuselage 16 (FIG. 12). The shear load may be determined analytically based on computer simulation. Alternatively, the shear load may be determined during static testing using strain gauges or other instrumentation. The shear load may also be measured during flight testing.

Step 608 of the method may comprise determining a cabin pressurization load P (FIG. 3) on the fuselage 16 (FIG. 12). The cabin pressurization load P may be determined based upon FAA requirements for maintaining the pressure altitude of the cabin. For example, with safety factors, the fuselage 16 may be required to withstand up to 18.2 psi although the fuselage 16 may be configured to withstand higher pressurization loads.

Step 610 of the method may comprise determining a hoop tension load (not shown) generated in the side region 40 (FIG. 12) as a result of the cabin pressurization load P (FIG. 3). The hoop tension load may be determined by computer simulation or by measuring the loads acting on the fuselage 16 (FIG. 12) during full-scale testing or during flight testing such by using strain gauges (not shown) that may be coupled to the fuselage 16 skin 42 (FIG. 12).

Step 612 of the method may comprise determining a resultant load path $N_{result}$ (FIG. 12) of a resultant of the combination of the shear load (not shown) and the hoop tension load (not shown). For example, the resultant load path $N_{result}$ may be determined mathematically based upon the magnitude and orientation of the known shear load (not shown) and the known hoop tension load (not shown). The resultant load path $N_{result}$ may also be determined for other combinations of load paths and is not limited to the resultant load path $N_{result}$ of the combination of the shear load and hoop tension load. For example, the resultant load path $N_{result}$ may be based on torsional loads induced in the fuselage 16 (FIG. 12) by the elevator 30 (FIGS. 1A-1B) and/or rudder 26 (FIGS. 1A-1B).

Step 614 may comprise configuring the cutouts 52 (FIG. 12) such that the load path extends along the side region 40 (FIG. 12) substantially continuously from the lower portion 76 (FIG. 12) of the side region 40 under the first cutout 52a to the upper portion 74 (FIG. 12) of the side region 40 over the second cutout 52b. The cutouts 52 may also be configured such that the resultant load path $N_{result}$ extends substantially continuously from the lower portion 76 of the side region 40 under the second cutout 52b to the upper portion 74 of the side region 40 above the first cutout 52a.

Step 616 may comprise providing the cutouts 52 (FIG. 12) in a diamond shape having side segments 58 (FIG. 12) that are oriented generally parallel to a load path such as the resultant load path $N_{result}$ (FIG. 12). The side segments 58 may alternatively be oriented along the shear load path $N_{result}$. The side segments 58 may also be oriented generally parallel to the resultant load path $N_{result}$ of the combination of the shear load (not shown), the hoop tension load (not shown), and other loads that may be imposed on the fuselage 16 (FIG. 12).

Step 618 may comprise orienting at least a portion of the fibers 44 (FIG. 12) of the skin 42 (FIG. 12) to be substantially parallel to a load path such as the resultant load path $N_{result}$ (FIG. 12). The fibers 44 of the skin 42 may extend from a position generally below the lower end 60b of the first cutout 52a to a position generally above the upper end 60a of the second cutout 52b. The fibers 44 of the skin 42 may be oriented at an angle of between approximately 50 degrees to 75 degrees relative to the longitudinal axis 12 (FIG. 12) of the aircraft 10 (FIG. 12). However, the fibers 44 may be oriented at angles of less than 50 degrees and greater than 75 degrees.

Step 620 may comprise laminating composite pad-up plies 84 (FIG. 16) over the skin 42 (FIG. 16) in a pad-up region 82 (FIG. 16) of the side region 40 (FIG. 16). Each pad-up ply 84 may include a plurality of pad-up ply fibers 86 (FIG. 16) which may be oriented substantially parallel to the load path. The pad-up region 82 may be result in a progressive increase in a thickness of the skin 42 in the pad-up region 82 relative to the nominal skin thickness $t_{nom}$ (FIG. 18).

Although the addition of passenger windows 50 (FIGS. 1A-1B) to an aircraft 10 (FIGS. 1A-1B) generally increases the overall weight of the aircraft 10 due to the structural reinforcement (i.e., the increased skin thickness) required for handling stress concentrations, the improved load path provided by the diamond shaped cutout 52 (FIG. 4) reduces stress concentrations in the side region 40 (FIG. 4) by an estimated 35 to 45 percent relative to conventional oval-shaped window cutouts (not shown) of approximately the same area. The reduction in stress concentrations allows for a reduction in skin thickness around the cutout 52 edges and in the window belt 49 (FIG. 4) which saves weight. The weight savings can be applied toward an increase in payload capacity or an improvement in the fuel economy of the aircraft 10. Alternatively, the weight savings achieved with diamond shaped cutouts 52 (FIG. 4) can be applied toward windows 50 that are larger in area. Although larger windows 50 require an increase in the skin thickness in the window belt 49 (FIG. 4), the maximum thickness of the skin 42 for diamond shaped windows 50 is less than for conventional oval-shaped windows of the same area.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A method of forming cutouts in an aircraft fuselage, comprising the steps of:
   forming a first cutout and a second cutout in side-by-side relation to one another in a side region of a fuselage, the side region including a single skin formed as a laminate of composite material having a plurality of reinforcing fibers embedded within a matrix;
   configuring the first cutout and the second cutout such that a direct load path extends along the side region substantially continuously from a lower portion of the side region generally under the first cutout to an upper portion of the side region generally over the second cutout; and
   orienting the reinforcing fibers substantially parallel to the direct load path along a spiral direction from the lower portion to the upper portion.

2. The method of claim 1, further comprising the steps of:
   determining a bending moment on the fuselage;
   determining a shear load generated in the side region in response to the bending moment; and
   configuring the first cutout and the second cutout such that a path of the shear load extends along the side region substantially continuously from the lower portion under the first cutout to the upper portion over the second cutout.

3. The method of claim 2, further comprising the steps of:
   determining a cabin pressurization load on the fuselage;
   determining a hoop tension load generated in the side region by the cabin pressurization load;
   determining a path of a resultant of the shear load and the hoop tension load; and
   configuring the first cutout and the second cutout such that the resultant load path extends along the side region substantially continuously from the lower portion under the first cutout to the upper portion over the second cutout.

4. The method of claim 1, wherein the side region includes a skin having a nominal skin thickness, the method further comprising the steps of:
   forming a pad-up region in the side region at least in an area between the first and second cutout; and
   increasing a thickness of the skin in the pad-up region relative to the nominal skin thickness.

5. The method of claim 4, wherein the step of forming the pad-up region in the side region includes:
   extending the pad-up region below and/or above a level of the first and second cutout.

6. The method of claim 4, wherein the step of forming the pad-up region in the side region includes:
   laminating pad-up plies in X-shapes such that the pad-up plies pass through a throat between the first and second cutout.

7. The method of claim 6, wherein the pad-up plies contain pad-up ply fibers, the step of laminating the pad-up plies includes:
   orienting the pad-up ply fibers along a direction generally parallel to one or more load paths in the side region.

8. The method of claim 1, wherein the side region includes a skin formed of composite material having a plurality of reinforcing fibers embedded within a matrix, the method further comprising the step of:
orienting at least a portion of the fibers substantially parallel to the load path.

9. The method of claim 1, wherein the side region includes a skin formed of composite material having a plurality of reinforcing fibers embedded within a matrix, the method further comprising the step of:
orienting at least a portion of the fibers at an angle of approximately 50 to 75 degrees relative to a longitudinal axis of the aircraft.

10. The method of claim 1, further comprising the step of:
forming the first and second cutout in a diamond shape having a major axis and a minor axis.

11. The method of claim 10, wherein the diamond shape has four side segments, the method further comprising the step of:
orienting at least one of the side segments substantially parallel to the load path.

12. The method of claim 10, wherein the diamond shape has a height A measured along a major axis and a width B measured along a minor axis, the method further comprising the step of:
forming the cutout at height A ranging in size from approximately 1.3B to approximately 5B.

13. The method of claim 10, wherein the diamond shape has a height A measured along a major axis, the method further comprising the steps of:
providing the diamond shape with rounded end corners of radius r and rounded side corners of radius $r_b$;
the end radii $r_a$ having a size of at least 0.05 A; and
the side radii $r_b$ having a size of at least 0.05 A.

14. The method of claim 10, further comprising the step of:
forming the diamond shaped cutout with straight side segments.

15. The method of claim 10, further comprising the step of:
forming the diamond shaped cutout with rounded sides.

16. The method of claim 10, wherein at least one of the first and second cutout has a diamond shape having a major axis and a minor axis, the method further comprising the step of:
orienting the major axis within +/−20 degrees of a circumferential axis of the aircraft.

17. The method of claim 1, wherein the step of forming the first and second cutout in the side region comprises:
forming the first and second cutout in a side panel of a barrel section of the fuselage.

18. The method of claim 17, wherein the barrel section includes:
one or more side panels located on opposing sides of the barrel section.

19. The method of claim 17, wherein:
the side panel includes a skin formed of composite material having a plurality of reinforcing fibers embedded within a matrix; and
at least a portion of the fibers being oriented in substantially parallel relation to the load path.

20. A method of forming cutouts in a barrel section of an aircraft fuselage, the method comprising the steps of:
forming a first cutout and a second cutout in side-by-side relation to one another in a side region of a barrel section of the fuselage, the side region including a single skin formed as a laminate of composite material having a plurality of reinforcing fibers embedded within a matrix;
configuring the first cutout and the second cutout such that a direct load path extends along the side region substantially continuously from a lower portion of the side region generally under the first cutout to an upper portion of the side region generally over the second cutout; and
orienting at least some of the reinforcing fibers substantially parallel to the direct load path along a spiral direction from the lower portion to the upper portion.

* * * * *